US008494010B2

(12) United States Patent
Suzuki

(10) Patent No.: US 8,494,010 B2
(45) Date of Patent: Jul. 23, 2013

(54) DATA TRANSFER DEVICE, DATA TRANSMITTING DEVICE, DATA RECEIVING DEVICE, AND DATA TRANSFER METHOD

(75) Inventor: Kenji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 12/929,511

(22) Filed: Jan. 28, 2011

(65) Prior Publication Data

US 2011/0128977 A1 Jun. 2, 2011

Related U.S. Application Data

(63) Continuation of application No. PCT/JP2008/063770, filed on Jul. 31, 2008.

(51) Int. Cl.
*H04J 3/16* (2006.01)
(52) U.S. Cl.
USPC ...................................... 370/509; 365/233.12
(58) Field of Classification Search
None
See application file for complete search history.

(56) References Cited

U.S. PATENT DOCUMENTS

| 6,681,277 B1 | 1/2004 | Ishibashi |
| 2001/0052808 A1 | 12/2001 | Hamamoto et al. |
| 2003/0103407 A1* | 6/2003 | Ooishi et al. ................. 365/233 |
| 2003/0112042 A1 | 6/2003 | Takahashi |
| 2005/0264316 A1 | 12/2005 | Atkinson |
| 2007/0005923 A1 | 1/2007 | Ito |
| 2008/0192030 A1* | 8/2008 | Yang et al. ..................... 345/204 |

FOREIGN PATENT DOCUMENTS

| JP | 06-164581 | 6/1994 |
| JP | 2001-067310 | 3/2001 |
| JP | 2001-118325 | 4/2001 |
| JP | 2001-351381 | 12/2001 |
| JP | 2003-188705 | 7/2003 |
| JP | 2004-038411 | 2/2004 |
| JP | 2008-501197 | 1/2005 |
| JP | 2005-065136 | 3/2005 |
| JP | 2005-208811 | 8/2005 |
| JP | 2007-011788 | 1/2007 |

OTHER PUBLICATIONS

Japanese Office Action issued Sep. 25, 2012 in corresponding Japanese Patent Application No. 2010-522570.
International Search Report for corresponding International Application PCT/JP2008/063770; mailing date Oct. 21, 2008.

* cited by examiner

*Primary Examiner* — Jianye Wu
(74) *Attorney, Agent, or Firm* — Staas & Halsey LLP

(57) ABSTRACT

The change of the transfer mode is notified using a predetermined bit in a header of a packet. Accordingly, the transfer mode can be dynamically switched from a DDR to a SDR, in which power consumption is low, without complicating the configuration. When the transfer mode is the SDR, further power saving is realized by changing the slew rate or stopping some circuits.

16 Claims, 25 Drawing Sheets

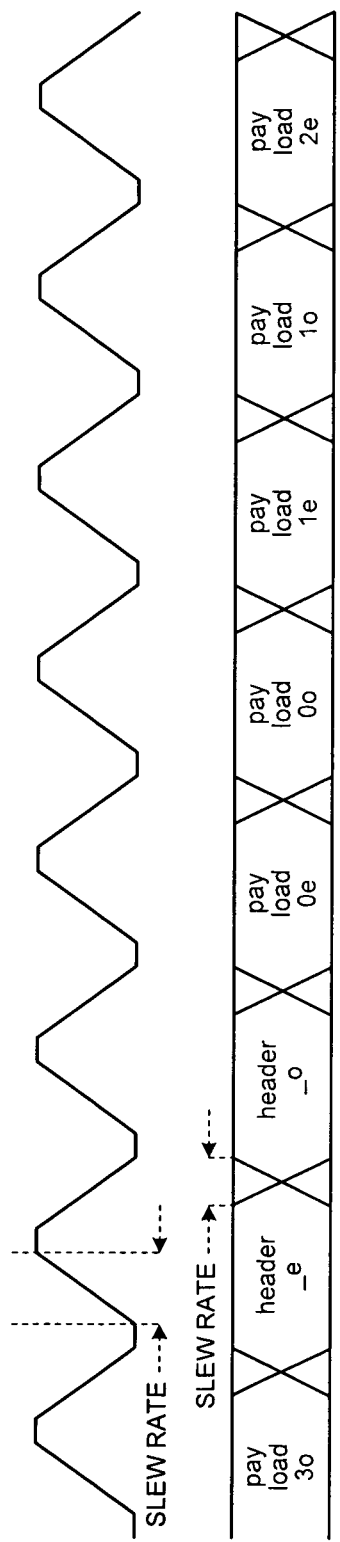

FIG.15

| leng | FUNCTION |
|---|---|
| 0000 | 1-CYCLE PACKET: PACKET OF header ONLY |
| 0001 | 2-CYCLE PACKET: PACKET OF header AND payload0 |
| 0010 | 3-CYCLE PACKET: PACKET OF header, payload0 AND payload1 |
| : | (OMITTED) |
| 1111 | 16-CYCLE PACKET: PACKET OF header AND payload0 TO payload14 |

FIG.16

| cmd | FUNCTION |
|---|---|
| 0000 | IDLE<br>PACKET FED THROUGH BUS WHEN NO INFORMATION TO BE TRANSFERRED IS PRESENT<br>DISCARDED IN RECEIVING CIRCUIT |
| 0001 | Reserved |
| 0010 | I/O Read<br>READ FROM I/O SPACE ADDRESS |
| 0011 | I/O Write<br>WRITE TO I/O SPACE ADDRESS |
| 0100 TO 0101 | Reserved |
| 0110 | Memory Read<br>READ FROM Memory SPACE ADDRESS |
| 0111 | Memory Write<br>WRITE TO Memory SPACE ADDRESS |
| 1000 TO 1001 | Reserved |
| 1010 | Configuration Read<br>READ FROM Configuration SPACE ADDRESS |
| 1011 | Configuration Write<br>WRITE TO Configuration SPACE ADDRESS |
| 1100 TO 1111 | Reserved |

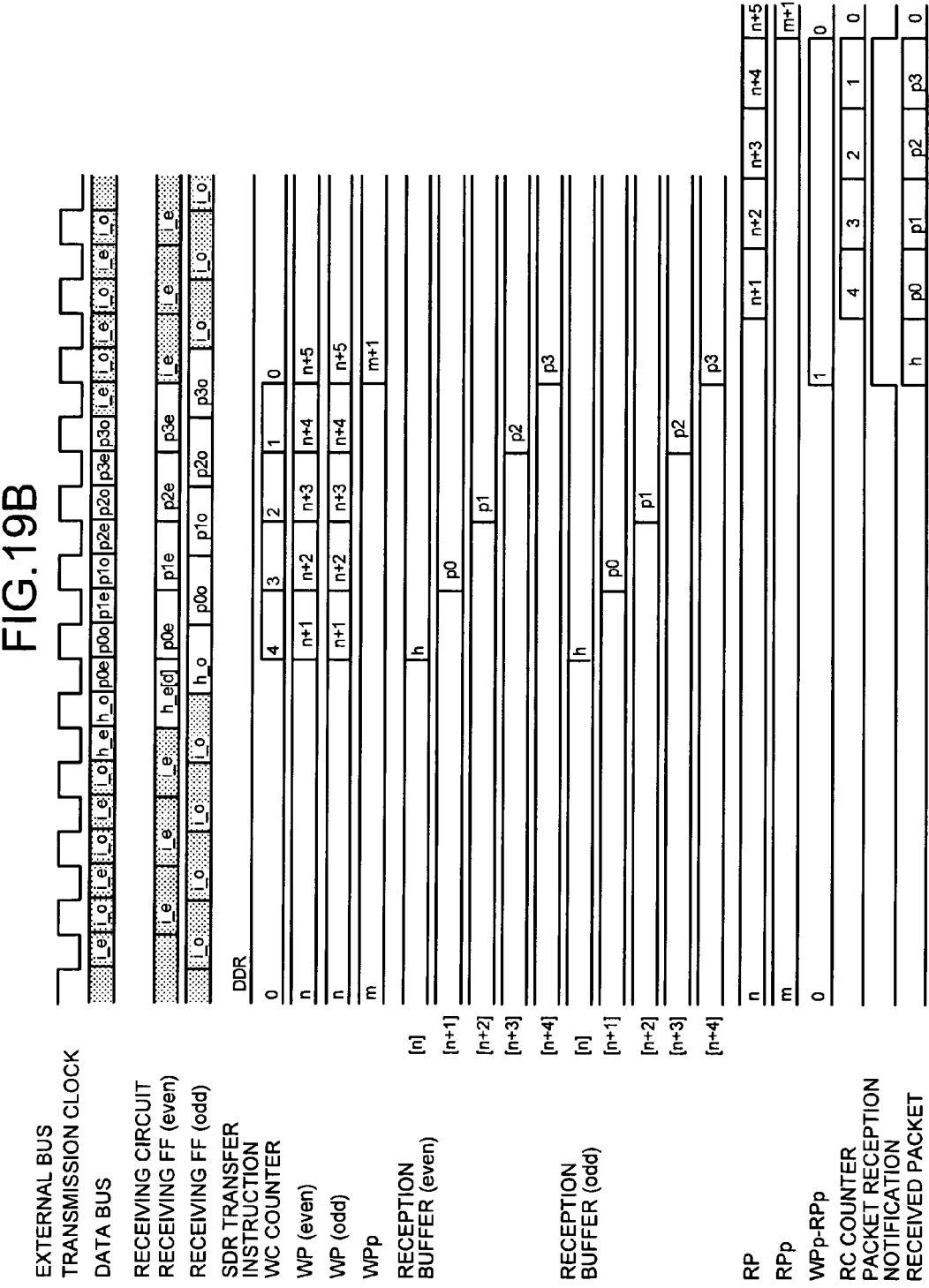

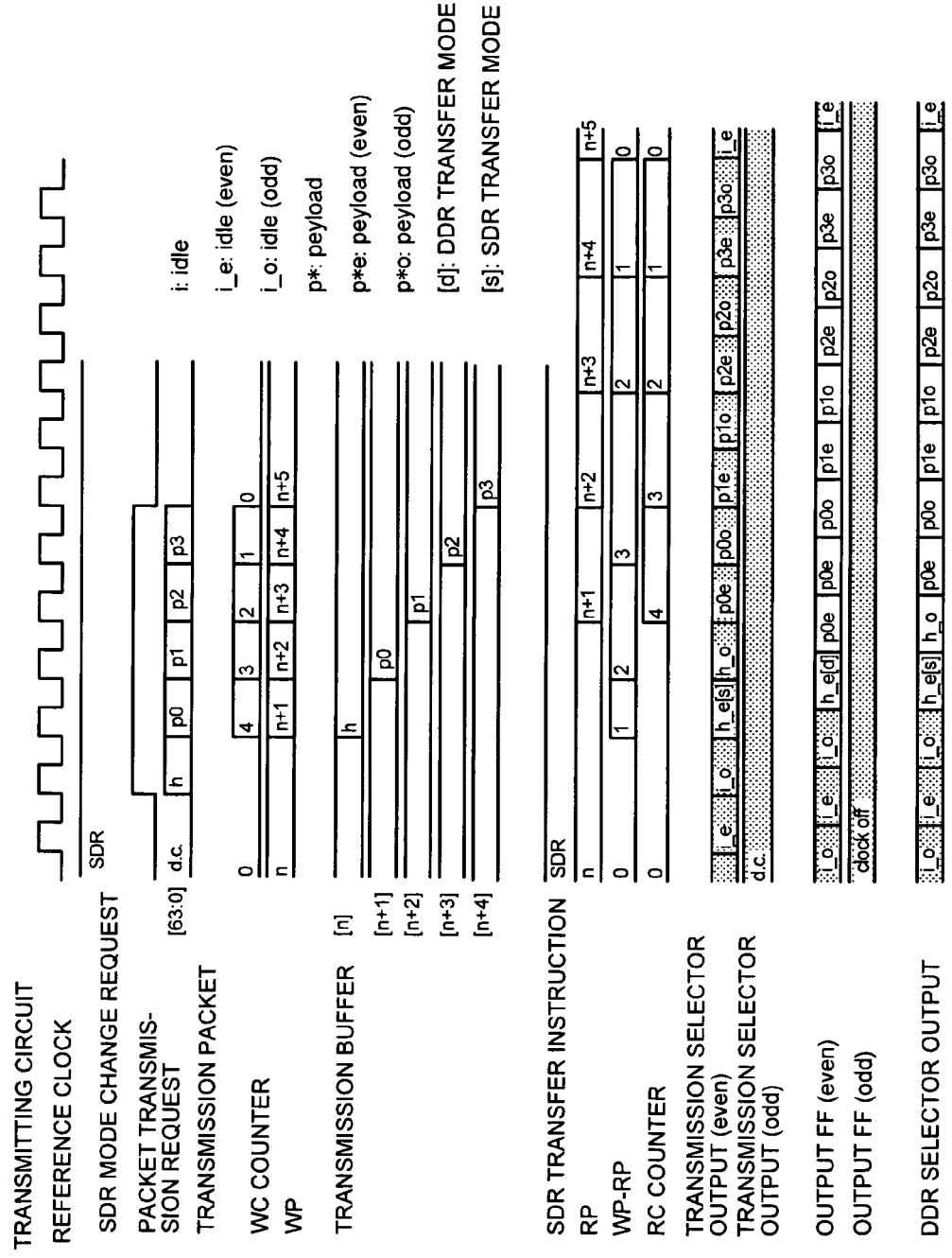

DATA TRANSFER DEVICE, DATA TRANSMITTING DEVICE, DATA RECEIVING DEVICE, AND DATA TRANSFER METHOD

CROSS-REFERENCE TO RELATED APPLICATION

This application is a continuation of International Application No. PCT/JP2008/063770, filed on Jul. 31, 2008, the entire contents of which are incorporated herein by reference.

FIELD

The embodiment discussed herein is directed to a data transfer device, a data transmitting device, a data receiving device and a data transfer method.

BACKGROUND

In recent years, power saving in information processing devices has been an important issue and there has also been a strong demand for power saving in a bus that is a signal transmission path in an information processing device. As one attempt to realize power saving of a bus, the PCI Express, which is an I/O bus widely used at present, has a mode called a sleep mode. The sleep mode is a mode in which a bus is brought into a stopped state in such a case where the bus has not been used for a certain period.

As another attempt to reduce power consumption in a bus, changing the transfer mode from the double data rate (DDR) to the single data rate (SDR) depending on the situation can be conceived. A known technique of changing the transfer mode is, for example, a technique of providing a signal line for transmitting a signal indicating whether to transmit data at the DDR or at the SDR and switching a signal to be transmitted via the signal line to change the transfer mode.

However, the method of realizing power saving using a sleep mode can only be applied to limited cases because it is necessary that a bus be not used at all for a certain period. For example, when a bus is continuously used, the bus cannot be brought into the sleep mode because the data cannot be transferred via the bus in the sleep mode.

On the other hand, the method of changing the transfer mode from the DDR to the SDR can be applied even when a bus is continuously used if the use rate of the bus is low. However, if a signal line for transmitting a signal specifying the transfer mode is provided separately from a signal line for transmitting data signals as in the aforementioned related technology, this causes disadvantageous effects such as complicated configuration of the devices and increase in the cost.
Patent Document: Japanese Laid-open Patent Publication No. 2001-118325

SUMMARY

According to an aspect of an embodiment of the invention, a data transfer device includes a transmitting circuit that transmits data to another data transfer device in a first transfer mode in which data is transferred at every rising and falling of a clock signal or in a second transfer mode in which data is transferred at every rising or at every falling of a clock signal; and a receiving circuit that receives data transmitted from the another data transfer device in the first transfer mode or in the second transfer mode. The transmitting circuit includes a determining unit that determines whether to transmit data in the first transfer mode or in the second transfer mode; a setting unit that sets transfer mode information, which indicates the determined first or second transfer mode, in the data; an output unit that outputs data using the determined first or second transfer mode to the another data transfer device in synchronization with the clock signal; and a transmission control unit that, when a transfer mode determined by the determining unit has changed, instructs the setting unit to set transfer mode information indicating a transfer mode as changed in data and instructs the output unit to output data using the transfer mode as changed after outputting of a first data piece in which a value indicating the transfer mode as changed is set is completed. The receiving circuit includes a receiving unit that receives data transmitted from the another data transfer device in a predetermined one of the first transfer mode and the second transfer mode in synchronization with the clock signal; and a reception control unit that, when transfer mode information contained in the received data is different from the predetermined one of the first data transfer mode and the second data transfer mode, instructs the receiving unit to receive data according to the transfer mode information after receiving the whole of the data containing the transfer mode information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3B is a diagram illustrating a slew rate in a SDR transfer mode;

FIG. 15 is a table illustrating a list of codes set in "leng";

FIG. 16 is a table illustrating a list of codes set in "cmd";

FIGS. 19A and 19B illustrate an operation in the DDR transfer mode;

FIGS. 20A and 20B illustrate an operation in the SDR transfer mode;

DESCRIPTION OF EMBODIMENT

A preferred embodiment of the present invention will be explained with reference to accompanying drawings. It should be noted that the invention is not limited to the embodiment. In the embodiment described below, an example in which the data transfer device disclosed herein is separated into two independent circuits, which are a transmitting circuit and a receiving circuit. However, the data transfer device may be configured as one circuit having both the configurations of the transmitting circuit and the receiving circuit.

Figure 1:
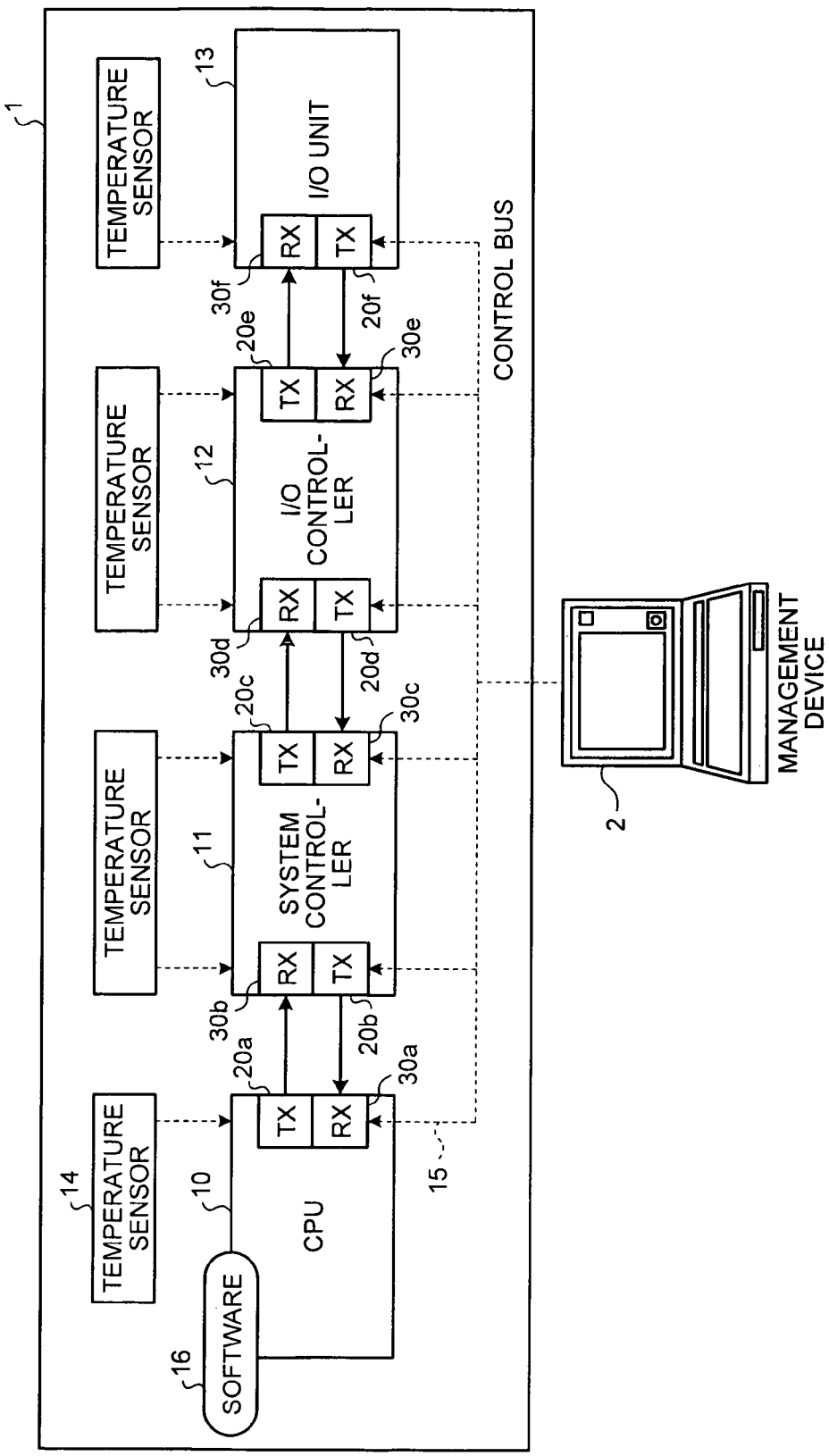
FIG. 1 is a block diagram illustrating a configuration of an information processing device including a data transfer device according to the embodiment.

First, an information processing device including the transmitting circuit and the receiving circuit according to the embodiment will be described. FIG. 1 is a block diagram illustrating a configuration of an information processing device 1 including the transmitting circuit and the receiving circuit according to the embodiment. As illustrated in FIG. 1, the information processing device 1 includes a central processing unit (CPU) 10, a system controller 11, an I/O controller 12 and an I/O unit 13.

The CPU 10 is a processing unit that executes various arithmetic operations. The system controller 11 is a unit that controls accesses to the I/O controller 12 connected with a memory (not illustrated) or the I/O unit 13 according to a request from the CPU 10. The I/O controller 12 is a unit that controls input/output processes from/to various input/output units according to a request from the system controller 11. The I/O unit 13 is a unit that executes input/output processes according to a request from the I/O controller 12.

The CPU 10 includes a transmitting circuit 20a and a receiving circuit 30a. The system controller 11 includes transmitting circuits 20b and 20c, and receiving circuits 30b and 30c. The I/O controller 12 includes transmitting circuits 20d and 20e, and receiving circuits 30d and 30e. The I/O unit 13 includes a transmitting circuit 20f and a receiving circuit 30f. The transmitting circuits 20a to 20f are circuits having the same configuration, and these are collectively referred to as a transmitting circuit 20 in the description below. The receiving circuits 30a to 30f are circuits having the same configuration, and these are collectively referred to as a receiving circuit 30 in the description below.

The transmitting circuit 20 transmits packets in which data and control information are stored to the corresponding receiving circuit 30. The receiving circuit 30 receives packets transmitted from the corresponding transmitting circuit 20. The combination of the transmitting circuit 20a and the receiving circuit 30a, the combination of the transmitting circuit 20b and the receiving circuit 30b, and the combination of the transmitting circuit 20c and the receiving circuit 30c correspond to the data transfer devices, respectively. Similarly, the combination of the transmitting circuit 20d and the receiving circuit 30d, the combination of the transmitting circuit 20e and the receiving circuit 30e, and the combination of the transmitting circuit 20f and the receiving circuit 30f also correspond to the data transfer devices, respectively.

Packets are transferred either at the DDR or at the SDR between the corresponding transmitting circuit 20 and receiving circuit 30. The transfer mode is dynamically switched between a mode in which packets are transferred at the DDR (hereinafter referred to as a "DDR transfer mode") and a mode in which packets are transferred at the SDR (hereinafter referred to as a "SDR transfer mode"). For example, if the bus use rate is high, the transfer mode is switched to the DDR transfer mode so as to increase the throughput, and if the bus use rate is low, the transfer mode is switched to the SDR transfer mode so as to reduce the power consumption.

In addition, if a temperature higher than a threshold is detected by a temperature sensor 14 provided in the information processing device 1, the transfer mode is switched to the SDR transfer mode so as to reduce transfer errors. The switching of the transfer mode is also performed according to instructions from a management device 2 connected with the information processing device 1 via a control bus 15, various units such as the CPU 10 in the information processing device 1, or software 16 running on the CPU 10. The management device 2 is a device that monitors operations of the information processing device 1.

Figure 2:
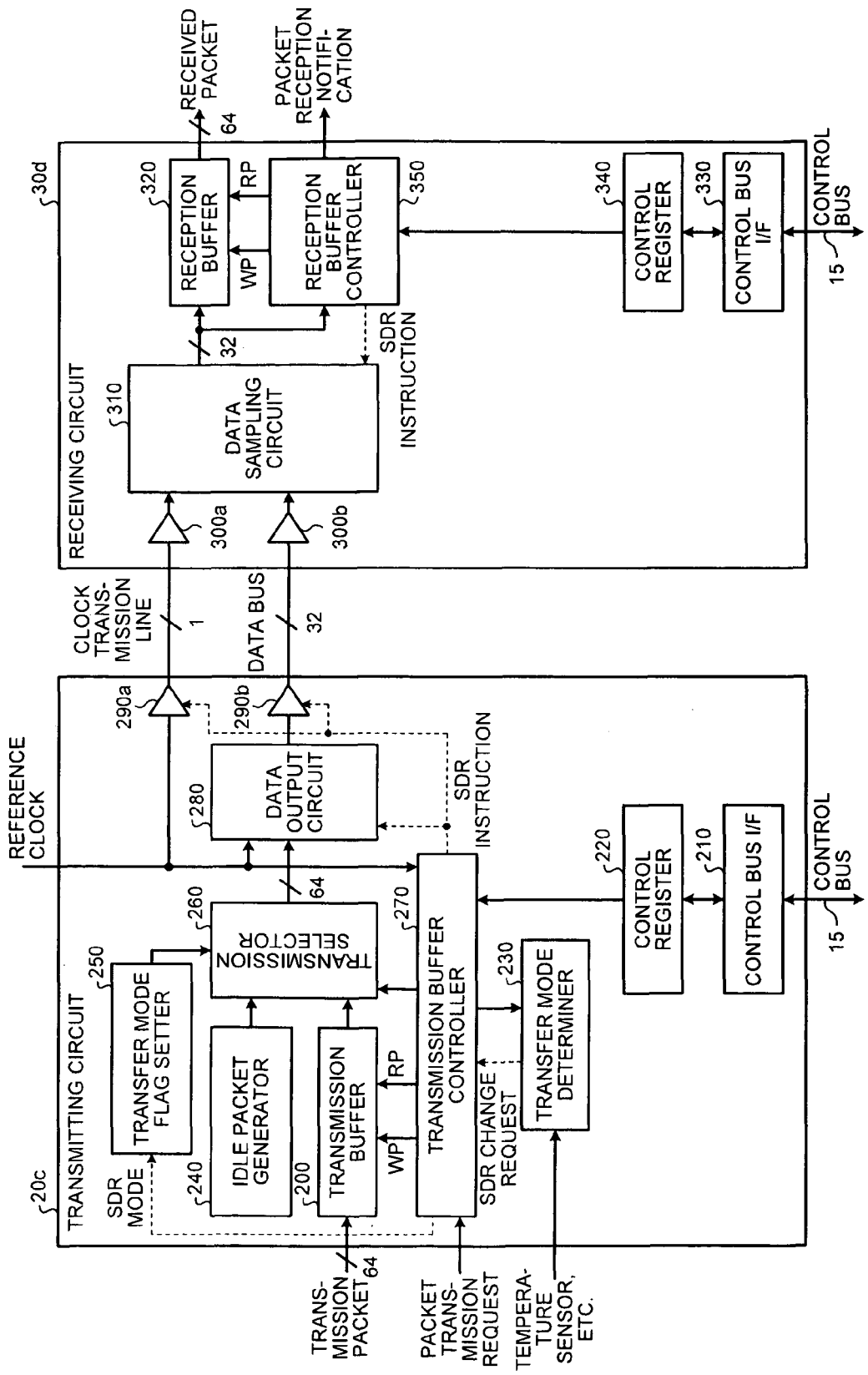
FIG. 2 is a block diagram illustrating an outline of a configuration of a transmitting circuit and a receiving circuit.

Next, an outline of the configuration of the transmitting circuit 20 and the receiving circuit 30 illustrated in FIG. 1 will be described. In this description, the configuration of the transmitting circuit 20c and the receiving circuit 30d will be described as an example of the configuration of the transmitting circuit 20 and the receiving circuit 30. FIG. 2 is a block diagram illustrating the outline of the configuration of the transmitting circuit 20c and the receiving circuit 30d.

As illustrated in FIG. 2, the transmitting circuit 20c receives transmission packets from a 64-bit signal line and transfers transmission data to the receiving circuit 30d via a 32-bit data bus. The receiving circuit 30d outputs the received packets via a 64-bit signal line, for example. The transfer mode of the data bus connecting the transmitting circuit 20c and the receiving circuit 30d is dynamically switched to the DDR transfer mode or the SDR transfer mode. A clock signal for synchronization is also transmitted from the transmitting circuit 20c to the receiving circuit 30d.

The transmitting circuit 20c includes a transmission buffer 200, a control bus I/F 210, a control register 220, a transfer mode determiner 230, an IDLE packet generator 240, a transfer mode flag setter 250, a transmission selector 260, a transmission buffer controller 270, a data output circuit 280, a clock driver 290a and a data driver 290b.

The transmission buffer 200 queues transmission packets, which are packets to be transmitted. The control bus I/F 210 receives commands transmitted from the management device 2 via the control bus 15, and updates the control register 220 according to the received commands. The control register 220 stores various setting information relating to data transfer. For example, if the control bus I/F 210 receives a command forcibly specifying the transfer mode of the data bus from the management device 2, the content of the command is stored in the control register 220.

The transfer mode determiner 230 determines the transfer mode of the data bus between the transmitting circuit 20c and the receiving circuit 30d according to the use rate of the data bus, a detected value of the temperature sensor 14, a setting of the control register 220 or the like. Then, if the transfer mode is determined to be the DDR transfer mode, the transfer mode determiner 230 sets a SDR change request signal to be output to the transmission buffer controller 270 to OFF. On the other hand, if the transfer mode is determined to be the SDR transfer mode, the transfer mode determiner 230 sets the SDR change request signal to ON.

Specifically, the transfer mode determiner 230 sets the DDR transfer mode as a default transfer mode. Then, if the queue length of the transmission buffer 200 (hereinafter referred to as a "buffer queue length") is smaller than a threshold, the transfer mode determiner 230 determines that the use rate of the data bus is low and switches the transfer mode to the SDR transfer mode. Also if the detected value of the temperature sensor 14 is higher than a predetermined value, the transfer mode determiner 230 switches the transfer mode to the SDR transfer mode since the transmission error rate of the data bus is likely to become higher. Also if the control register 220 stores that an instruction to forcibly switch the transfer mode to the SDR transfer mode has been issued, the transfer mode determiner 230 switches the transfer mode to the SDR transfer mode. The transfer mode determiner 230 switches the transfer mode back to the DDR transfer mode when these circumstances are no longer present.

The IDLE packet generator 240 generates IDLE packets that are dummy packets transferred to the receiving circuit 30d when the transmission buffer 200 is empty. The transfer mode flag setter 250 sets a value indicating the transfer mode in the header of a packet transferred from the transmitting circuit 20c to the receiving circuit 30d.

Here, a method by which the transmitting circuit 20c notifies the receiving circuit 30d of the transfer mode is described. In order that the receiving circuit 30d successfully receives a packet, it is necessary that the receiving circuit 30d correctly know in which transfer mode the transmitting circuit 20c is transferring the packet. The transmitting circuit 20c uses a predetermined bit in the header of a packet to be transferred to the receiving circuit 30d, instead of using a dedicated signal line, so as to inform the receiving circuit 30d whether the transfer mode is the DDR transfer mode or the SDR transfer mode.

Specifically, if the predetermined bit in the header of the packet is set to "1," it is indicated that the transfer mode is the SDR transfer mode, and otherwise, it is indicated that the transfer mode is the DDR transfer mode. The value of the bit is set by the transfer mode flag setter 250. In this manner, the transfer mode is informed without providing any dedicate signal line, thereby it is possible to avoid complication of the configuration.

The transmission selector 260 outputs a transmission packet read out from the transmission buffer 200 or an IDLE packet generated by the IDLE packet generator 240 to the data output circuit 280 according to an instruction from the transmission buffer controller 270. The transmission selector 260 also sets the predetermined bit in the header of a packet to a value generated by the transfer mode flag setter 250 according to an instruction from the transmission buffer controller 270.

The transmission buffer controller 270 specifies a location in the transmission buffer 200 into which a new transmission packet is to be stored using a write pointer (hereinafter referred to as a "WP") and performs writing thereto. The transmission buffer controller 270 also specifies a location in the transmission buffer 200 from which a transmission packet is read using a read pointer (hereinafter referred to as a "RP") and performs reading therefrom.

If the transmission buffer controller 270 determines that a transmission packet is stored in the transmission buffer 200 based on the pointers, it instructs the transmission selector 260 to read the transmission packet from the transmission buffer 200 and output the read transmission packet. On the other hand, if the transmission buffer controller 270 determines that no transmission packet is stored in the transmission buffer 200 based on the pointers, it instructs the transmission selector 260 to output an IDLE packet.

The transmission buffer controller 270 also determines whether the transfer mode needs to be switched based on a SDR change request signal. If the transmission buffer controller 270 determines that the transfer mode needs to be switched, it carries out various controls necessary to switch the transfer mode. Specifically, if the transmission buffer controller 270 determines that it is necessary to change the transfer mode to the SDR transfer mode, it sets a SDR mode signal to be output to the transfer mode flag setter 250 to ON to instruct to output "1" as a value indicating the transfer mode. Then, after the transmission of a first packet in which the predetermined bit of the header is set to "1" is completed, the transmission buffer controller 270 sets a SDR instruction signal to be output to the data output circuit 280, the clock driver 290a and the data driver 290b to ON.

When the SDR instruction signal becomes ON, the data output circuit 280 starts transferring a packet input from the transmission selector 260 in the SDR transfer mode. In the DDR transfer mode, the data output circuit 280 outputs 32-bit data to the data driver 290b at every rising edge and falling edge of a reference clock. In the SDR transfer mode, on the other hand, the data output circuit 280 outputs 32-bit data to the data driver 290b only at rising edges. In the SDR transfer mode, the data output circuit 280 stops a circuit for outputting data at falling edges to thereby reduce the power consumption.

Figure 3A:
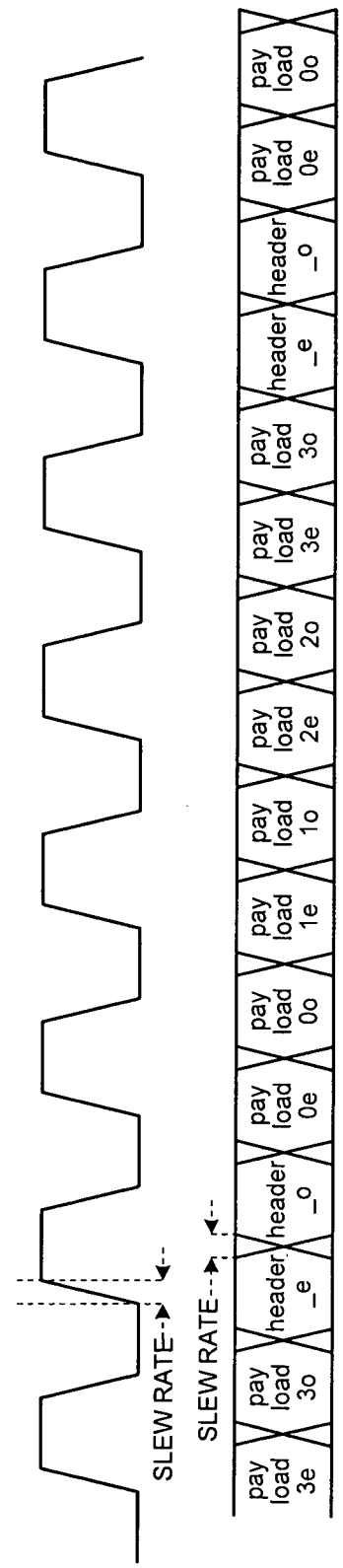
FIG. 3A is a diagram illustrating a slew rate in a DDR transfer mode.

If the SDR instruction signal becomes ON, the clock driver 290a, which outputs a clock signal to a clock transmission line, and the data driver 290b, which outputs data signals to a data bus, lower the slew rate representing the gradient of the rising voltage or the falling voltage per unit time of a signal to be output. FIG. 3A is a diagram illustrating a slew rate in the DDR transfer mode, and FIG. 3B is a diagram illustrating a slew rate in the SDR transfer mode. In the DDR transfer mode, the slew rate has to be increased in order to realize high-speed transmission as illustrated in FIG. 3A. In the SDR transfer mode, on the other hand, the power consumption is reduced since the signal frequency is lower as illustrated in FIG. 3B. In addition, in the SDR transfer mode, the slew rate can be lowered and thereby further power saving is realized.

After the SDR instruction signal is set to ON, the transmission buffer controller 270 instructs the transmission selector 260 to output IDLE packets for a predetermined number of cycles set in the control register 220. In this manner, a SDR transfer mode flag is set in a packet immediately before changing the transfer rate before transferring the packet, and IDLE packets are transferred for a predetermined number of cycles immediately after instruction to change the transfer rate, whereby it is possible to secure a sufficient time for the transmitting circuit 20c and the receiving circuit 30d to switch the transfer mode and avoid loss of packet due to the switching of the transfer mode. If the transmitting circuit 20c and the receiving circuit 30d can switch the transfer mode at a sufficiently high speed, the number of cycles during which IDLE packets are output immediately after the transfer rate is changed may be set to 0.

On the other hand, if the transmission buffer controller 270 determines that it is necessary to change the transfer mode to the DDR transfer mode, it sets a SDR mode signal to be output to the transfer mode flag setter 250 to OFF to instruct to output "0" as a value indicating the transfer mode. Then, after the transmission of a first packet in which the predetermined bit of the header is set to "0" is completed, the transmission buffer controller 270 sets a SDR instruction signal to be output to the data output circuit 280, the clock driver 290a and the data driver 290b to OFF.

When the SDR instruction signal becomes OFF, the data output circuit 280 starts transferring a packet input from the transmission selector 260 in the DDR transfer mode. Specifically, the data output circuit 280 starts outputting 32-bit data at every rising edge and falling edge of the reference clock. In addition, when the SDR instruction signal becomes OFF, the clock driver 290a and the data driver 290b increase the slew rate of a signal to be output.

After setting the SDR instruction signal to OFF, the transmission buffer controller 270 instructs the transmission selector 260 to output IDLE packets for a predetermined number of cycles set in the control register 220. In this manner, the transmission buffer controller 270 also secures sufficient time for the transmitting circuit 20c and the receiving circuit 30d to switch the transfer mode when changing the transfer mode to the DDR transfer mode.

Next, the receiving circuit 30d will be described. The receiving circuit 30d includes a clock receiver 300a, a data receiver 300b, a data sampling circuit 310, a reception buffer 320, a control bus I/F 330, a control register 340 and a reception buffer controller 350.

The clock receiver 300a receives a clock signal transmitted from the clock driver 290a, and supplies the received clock signal to the data sampling circuit 310. The data receiver 300b receives 32-bit data signals transmitted from the data driver 290b via a data bus and outputs the received data signals to the data sampling circuit 310. The data receiver 300b is configured to support both the DDR transfer mode and the SDR transfer mode.

The data sampling circuit 310 samples data signals input from the data driver 290b based on a clock signal supplied from the clock receiver 300a. Then, the data sampling circuit 310 outputs 32-bit data obtained by the sampling to the reception buffer 320 and the reception buffer controller 350.

Specifically, if the SDR instruction signal input from the reception buffer controller 350 is OFF, that is, if it is notified that the transfer mode is the DDR transfer mode, the data sampling circuit 310 samples at every rising edge and falling edge of the clock signal. On the other hand, if the SDR instruction signal is ON, that is, if it is notified that the transfer mode is the SDR transfer mode, the data sampling circuit 310 samples only at rising edges of the clock signal. In the SDR transfer mode, the data sampling circuit 310 stops a circuit for sampling data at falling edges to thereby reduce the power consumption.

The reception buffer 320 queues the data sampled by the data sampling circuit 310. The control bus I/F 330 receives commands transmitted from the management device 2 via the control bus 15, and updates the control register 340 according to the received commands. The control register 340 stores various setting information relating to data transfer.

The reception buffer controller 350 operates a WP to control a location in the reception buffer 320 into which new data is stored. The reception buffer controller 350 also operates a RP to control a location in the reception buffer 320 from which a packet is read and outputs the read data in 64-bit units to a downstream circuit, which is not illustrated.

Specifically, the reception buffer controller 350 determines which piece of the data input from the data sampling circuit 310 corresponds to the header and decodes the data piece corresponding to the header to obtain information such as the packet length. Then, if the data being received is an IDLE packet as a result of decoding, the reception buffer controller 350 discards the data of a length equal to the packet length without storing the data in the reception buffer 320. On the other hand, if the data being received is not an IDLE packet as a result of decoding, the reception buffer controller 350 stores the data of a length equal to the packet length in the reception buffer 320 while updating the WP. Then, at a point when the reception buffer controller 350 finished storing the data of a length equal to the packet length in the reception buffer 320, the packet composed of the data becomes a packet to be read.

The reception buffer controller 350 also refers to a value indicating the transfer mode set in the predetermined bit in the header when decoding. If it is determined that the transfer mode is changed as a result of the reference, the reception buffer controller 350 changes the SDR instruction signal after the reception of the data of a length equal to the packet length is completed, and notifies the data sampling circuit 310 of the change of the transfer mode. After the notification, the reception buffer controller 350 discards the data unconditionally for a predetermined number of cycles set in the control register 340. The same value as the predetermined number of cycles set in the control register 220 of the transmitting circuit 20c is set as a predetermined number of cycles in the control register 340.

In this manner, if the reception buffer controller 350 detects a change in the transfer of the transfer mode based on the value of the predetermined bit in the received packet, it performs control corresponding to the control in the mode change at the transmitting circuit 20c. Specifically, the reception buffer controller 350 allows a packet notifying the change of the transfer mode to be received in the previous transfer mode without any change. Then, after completing reception of the packet, the reception buffer controller 350 notifies the data sampling circuit 310 of the change of the transfer mode, and unconditionally discards IDLE packets transmitted from the transmitting circuit 20c for the predetermined number of cycles.

Figure 4:
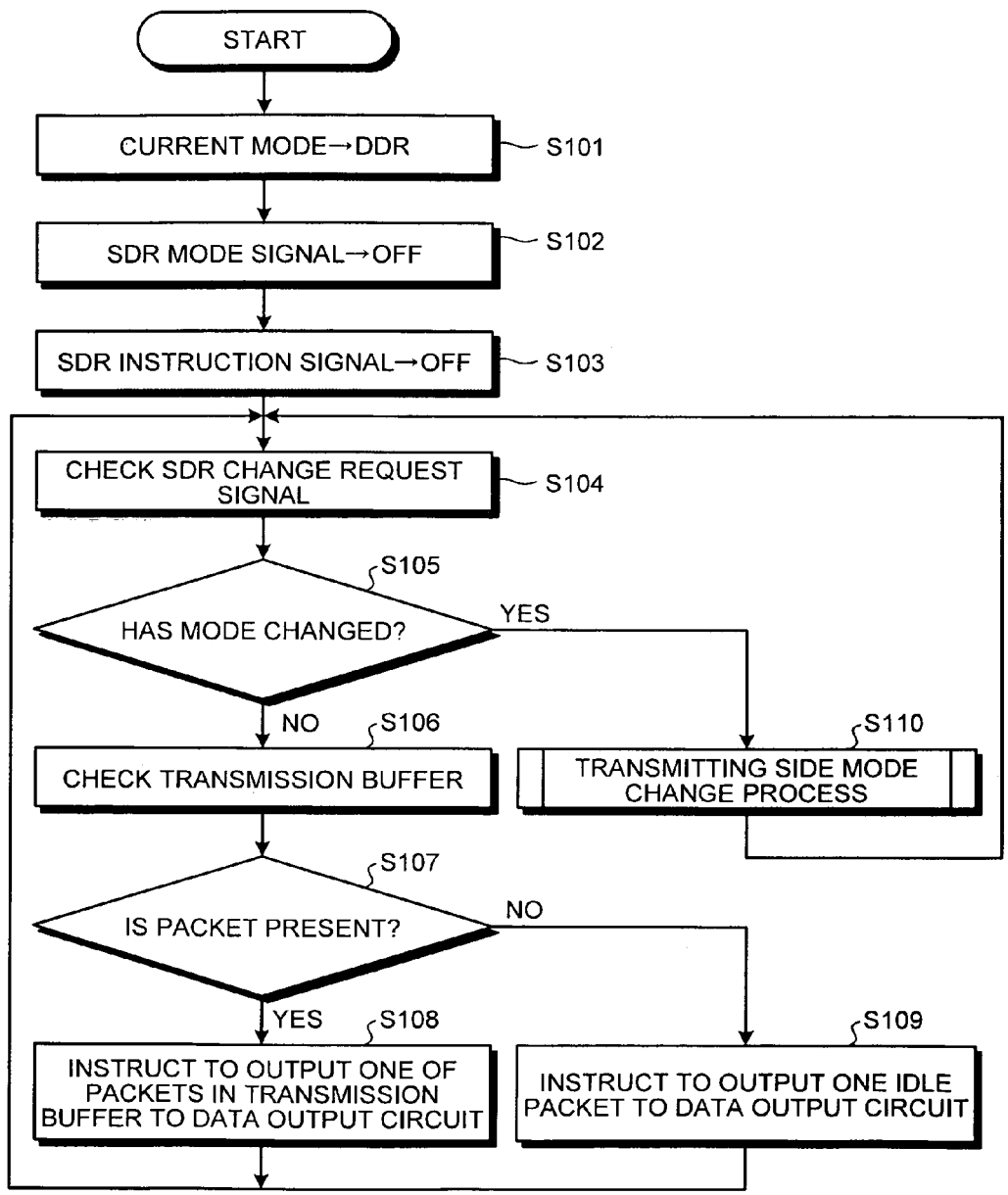
FIG. 4 is a flowchart illustrating procedures of a transmission buffer controller.

Next, procedures of the transmission buffer controller 270 and the reception buffer controller 350 illustrated in FIG. 2 will be described. FIG. 4 is a flowchart illustrating procedures of the transmission buffer controller 270. FIG. 4 illustrates only procedures relating to the change of the transfer mode out of procedures performed by the transmission buffer controller 270.

As illustrated in FIG. 4, when the transmission buffer controller 270 is activated, it sets a current transfer mode stored therein to the DDR transfer mode (step S101). Then, the transmission buffer controller 270 sets the SDR mode signal to be output to the transfer mode flag setter 250 to OFF (step S102) and sets the SDR instruction signal to be output to the data output circuit 280 to OFF (step S103).

Subsequently, the transmission buffer controller 270 checks the SDR change request signal input from the transfer mode determiner 230 (step S104). If the transfer mode indicated by the signal is the same as the current transfer mode (NO in step S105), the transmission buffer controller 270 checks whether or not a transmission packet is stored in the transmission buffer 200 (step S106). If a transmission packet is stored (YES in step S107), the transmission buffer controller 270 instructs the transmission selector 260 to output one of transmission packets stored in the transmission buffer 200 to the data output circuit 280 (step S108), and recommences the process from step S104.

On the other hand, if no transmission packet is stored (NO in step S107), the transmission buffer controller 270 instructs the transmission selector 260 to output one IDLE packet to the data output circuit 280 (step S109), and recommences the process from step S104.

If the transfer mode indicated by the SDR change request signal is different from the current transfer mode in step S104 (YES at step S105), the transmission buffer controller 270 performs a transmitting side mode change process (step S110), which will be described below, and recommences the process from step S104 thereafter.

Figure 5:
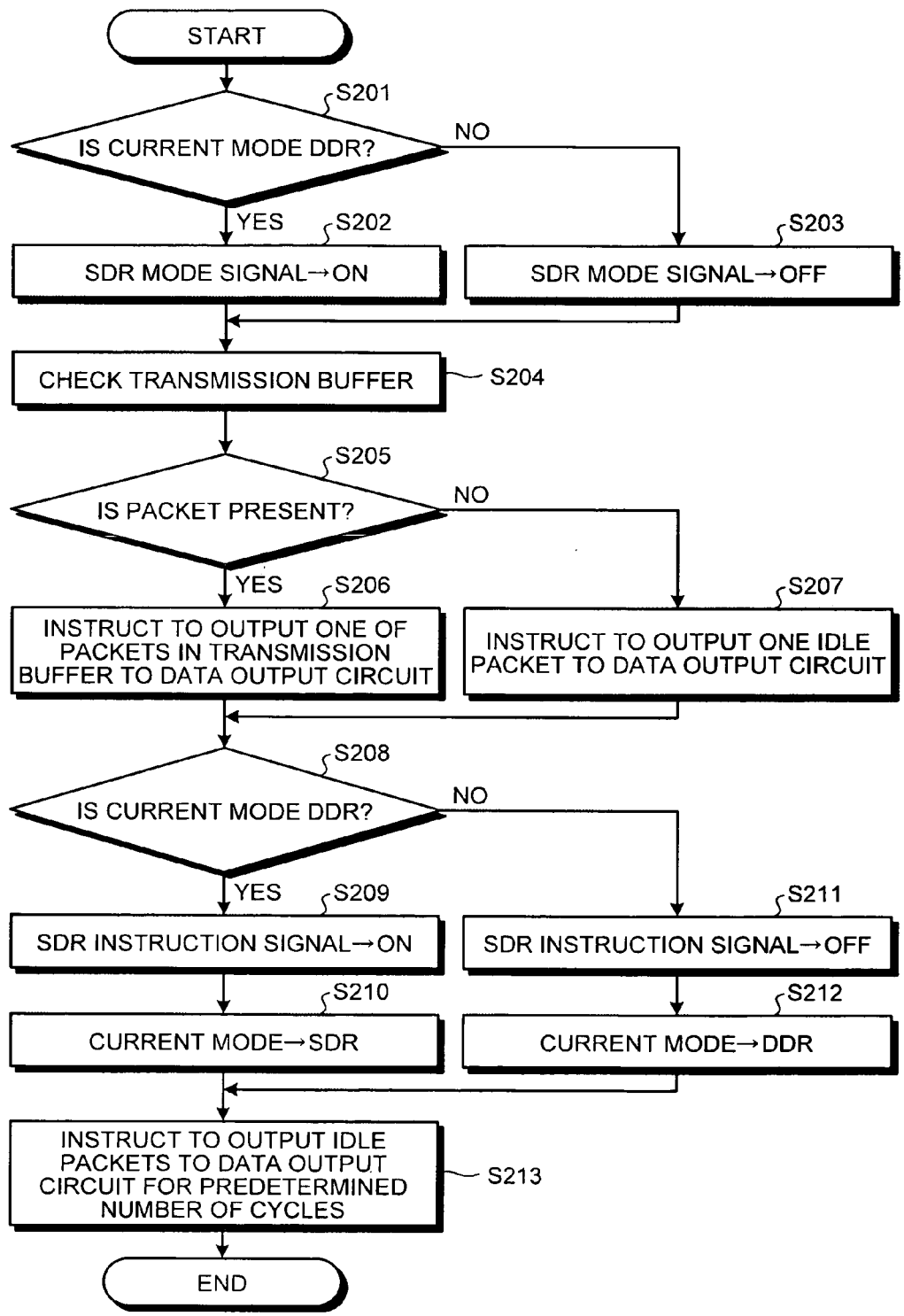
FIG. 5 is a flowchart illustrating procedures of a transmitting side mode change process.

FIG. 5 is a flowchart illustrating procedures of the transmitting side mode change process described in FIG. 4. If the current transfer mode is the DDR transfer mode (YES in step S201), the transmission buffer controller 270 sets the SDR mode signal to be output to the transfer mode flag setter 250 to ON (step S202). On the other hand, if the current transfer mode is the SDR transfer mode (NO in step S201), the transmission buffer controller 270 sets the SDR mode signal to be output to the transfer mode flag setter 250 to OFF (step S203).

After sending the instruction to the transfer mode flag setter 250 in this manner, the transmission buffer controller 270 checks whether or not a transmission packet is stored in the transmission buffer 200 (step S204). If a transmission packet is stored (YES in step S205), the transmission buffer controller 270 instructs the transmission selector 260 to output one of transmission packets stored in the transmission buffer 200 to the data output circuit 280 (step S206). On the other hand, if no transmission packet is stored (NO in step S205), the transmission buffer controller 270 instructs the transmission selector 260 to output one IDLE packet to the data output circuit 280 (step S207).

After instructing to transmit a packet notifying the change of the transfer mode to the receiving circuit 30d in this manner, if the current transfer mode is the DDR transfer mode (YES in step S208), the transmission buffer controller 270 sets the SDR instruction signal to ON to instruct the data output circuit 280, etc., to change the transfer mode to the SDR transfer mode (step S209). Then, the transmission buffer controller 270 resets the current transfer mode to the SDR transfer mode (step S210).

On the other hand, if the current transfer mode is the SDR transfer mode (NO in step S208), the transmission buffer controller 270 sets the SDR instruction signal to OFF to instruct the data output circuit 280, etc., to change the transfer mode to the DDR transfer mode (step S211). Then, the transmission buffer controller 270 resets the current transfer mode to the DDR transfer mode (step S212).

After instructing the respective units in the transmitting circuit 20c to change the transfer mode, the transmission buffer controller 270 instructs the transmission selector 260 to output IDLE packets to the data output circuit 280 for the predetermined number of cycles set in the control register 220 (step S213), and terminates the transmitting side mode change process.

Figure 6:
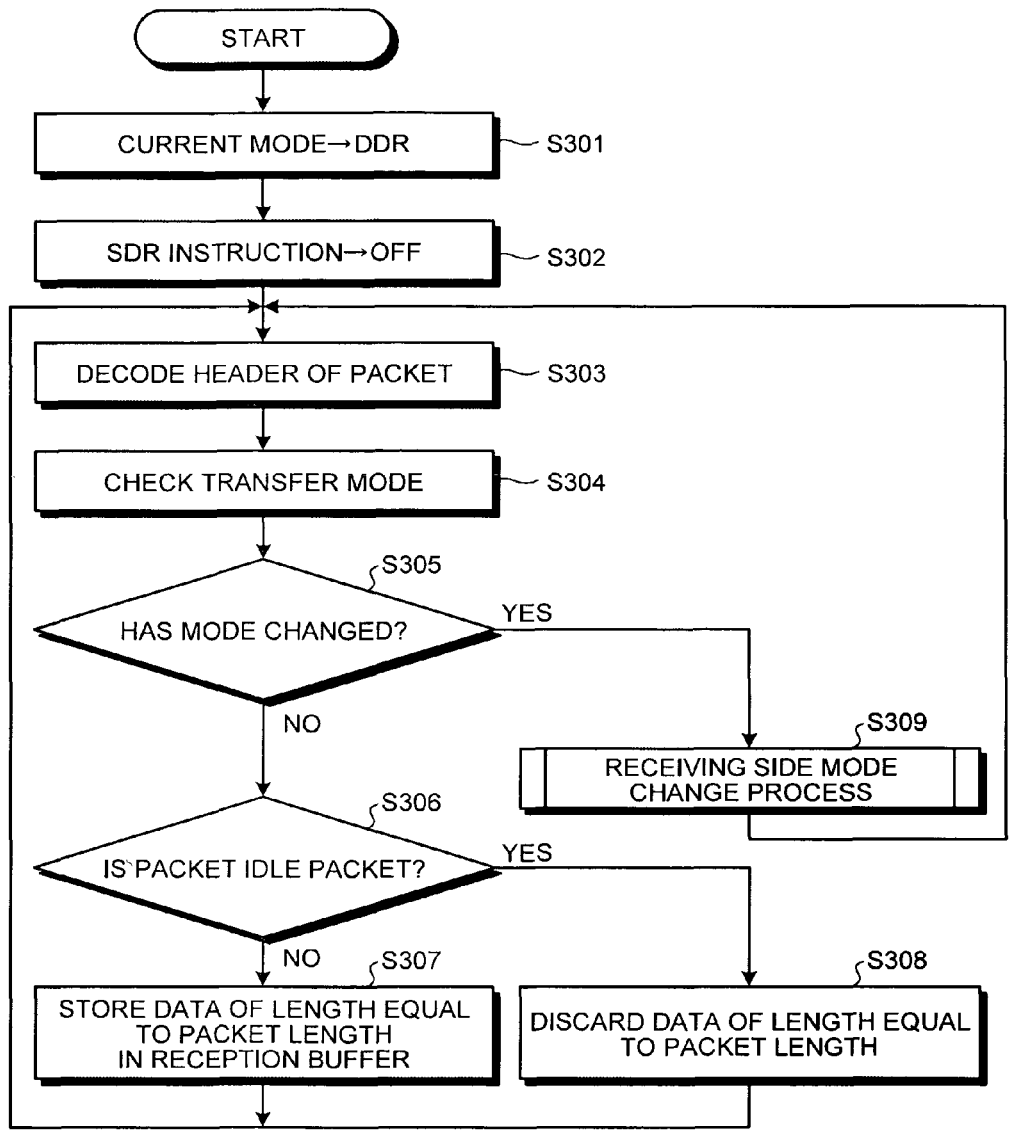
FIG. 6 is a flowchart illustrating procedures of a reception buffer controller.

FIG. 6 is a flowchart illustrating procedures of the reception buffer controller 350. FIG. 6 illustrates only procedures relating to the transfer mode out of procedures performed by the reception buffer controller 350.

As illustrated in FIG. 6, when the reception buffer controller 350 is activated, it sets a current transfer mode stored therein to the DDR transfer mode (step S301). Then, the reception buffer controller 350 sets the SDR instruction signal to be output to the data sampling circuit 310 to OFF (step S302).

Subsequently, the reception buffer controller 350 obtains a piece of data corresponding to the header of a packet out of data input from the data sampling circuit 310, and decodes the piece of data to obtain information such as the packet length (step S303). Then, the reception buffer controller 350 checks whether a SDR transfer mode flag is set in the header (step S304).

If the transfer mode indicated by the presence or the absence of the SDR transfer mode flag is the same as the transfer mode set as the current transfer mode, that is, if the transfer mode has not changed (NO in step S305), the reception buffer controller 350 determines whether or not the packet being received is an IDLE packet based on the result of decoding in S303. If the packet being received is not an IDLE packet (NO in step S306), the reception buffer controller 350 causes the data of a length equal to the packet length to be stored in the reception buffer 320 (step S307), and recommences the process from step S303.

On the other hand, if the packet being received is an IDLE packet (YES in step S306), the reception buffer controller 350 discards the data of a length equal to the packet length (step S308), and recommences the process from step S303.

If the transfer mode indicated by the presence or the absence of the SDR transfer mode flag is not the same as the transfer mode set as the current transfer mode in step S304, that is, if the transfer mode has changed (YES in step S305), the reception buffer controller 350 performs a receiving side mode change process (step S309), which will be described below, and recommences the process from step S303 thereafter.

Figure 7:
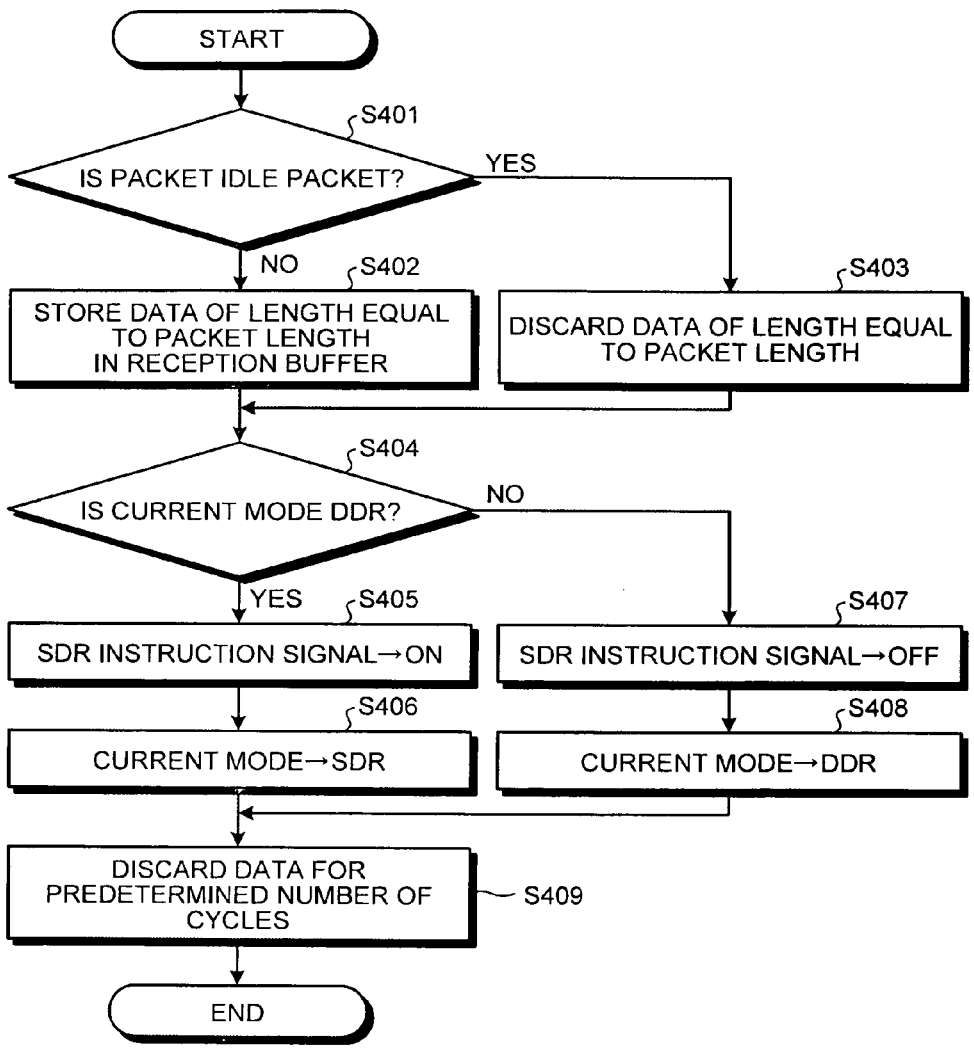
FIG. 7 is a flowchart illustrating procedures of a receiving side mode change process.

FIG. 7 is a flowchart illustrating procedures of the receiving side mode change process described in FIG. 6. The reception buffer controller 350 determines whether or not the packet being received is an IDLE packet based on the result of decoding in S303. If the packet being received is not an IDLE packet (NO in step S401), the reception buffer controller 350 causes the data of a length equal to the packet length to be stored in the reception buffer 320 (step S402). On the other hand, if the packet being received is an IDLE packet (YES in step S401), the reception buffer controller 350 discards the data of a length equal to the packet length (step S403).

After completing processing of the packet transferred before the change of the transfer mode in this manner, if the current transfer mode is the DDR transfer mode (YES in step S404), the reception buffer controller 350 sets the SDR instruction signal to ON to instruct the data sampling circuit 310 to change the transfer mode to the SDR transfer mode (step S405). Then, the reception buffer controller 350 resets the current transfer mode to the SDR transfer mode (step S406).

On the other hand, if the current transfer mode is the SDR transfer mode (NO in step S404), the reception buffer controller 350 sets the SDR instruction signal to OFF to instruct the data sampling circuit 310 to change the transfer mode to the DDR transfer mode (step S407). Then, the reception buffer controller 350 resets the current transfer mode to the DDR transfer mode (step S408).

After instructing the data sampling circuit 310 to change the transfer mode in this manner, the reception buffer controller 350 discards data output from the data sampling circuit 310 for the predetermined number of cycles set in the control register 340 (step S409), and terminates the receiving side mode change process.

Next, operations of the transmitting circuit 20c and the receiving circuit 30d during the change of the transfer mode will be described in terms of transmitted signals. In the embodiment, packets to be transferred from the transmitting circuit 20c to the receiving circuit 30d are assumed to be in a format illustrated in FIG. 13. Specifically, a packet to be transferred includes a 64-bit header and a payload having a length of a multiple of 64 bits. The first-half 32 bits of a header is referred to as an even side ("h_e" in the figures) and the second-half 32 bits thereof is referred to as an odd side ("h_o" in the figures). Further, 64-bit blocks of payload obtained by dividing the payload in 64-bit units are referred to as a payload 0, a payload 1, a payload 2 and so on from the first block, the first half 32 bits of each block is referred to as an even side ("p0*e*" and so on in the figures) and the second half 32 bits thereof is referred to as an odd side ("p0*o*" and so on in the figures).

Figure 17:
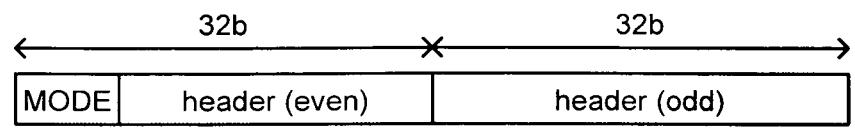
FIG. 17 is a diagram illustrating an IDLE packet format.

An IDLE packet is assumed to be a packet composed only of a header, as illustrated in FIG. 17. The first-half 32 bits of the header of an IDLE packet is referred to as an even side ("idle_e" in the figures) and the second-half 32 bits thereof is referred to as an odd side ("idle_o" in the figures).

Figure 8:
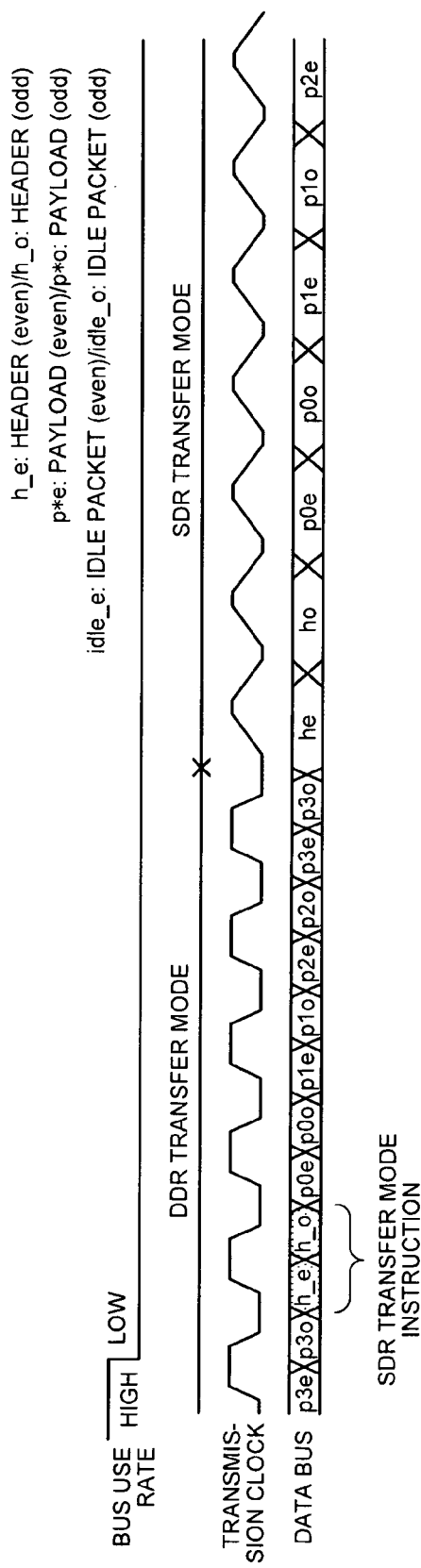
FIG. 8 is a diagram illustrating an example of an operation when the transfer mode is changed from the DDR transfer mode to the SDR transfer mode.

FIG. 8 is a diagram illustrating an example of an operation when the transfer mode is changed from the DDR transfer mode to the SDR transfer mode. It is assumed here that the value of the predetermined number of cycles set in the control register 220 is 0. As illustrated in FIG. 8, if the use rate of the bus is reduced, the transfer mode determiner 230 determines to change the transfer mode to the SDR transfer mode, and sets the SDR change request signal to ON to instruct the transmission buffer controller 270 to change the transfer mode.

The transmission buffer controller 270, which is instructed to change the transfer mode to the SDR transfer mode, sets the SDR mode signal to ON so as to set the predetermined bit of the header of a packet to be transmitted next to "1" indicating the SDR transfer mode. Since the transfer mode is still the DDR transfer mode at this point, the header and payload of the packet in which the SDR transfer mode flag is set is transmitted in 32-bit data at every rising edge and falling edge of the clock signal.

When the transmission of the entire packet is completed, the transmission buffer controller 270 sets the SDR instruction signal to ON to instruct the data output circuit 280, the clock driver 290*a* and the data driver 290*b* to change the transfer mode. The data output circuit 280, which is instructed to change the transfer mode to the SDR transfer mode, starts transmitting the header and the payload of the packet in 32-bit units only at rising edges of the clock signal. The clock driver 290*a*, which is instructed to change the transfer mode to the SDR transfer mode, increases the slew rate of the output signal. Although not illustrated, the data driver 290*b*, which is instructed to change the transfer mode to the SDR transfer mode, also increases the slew rate of the output signal.

On the other hand, the data sampling circuit 310 of the receiving circuit 30*d* samples data signals at every rising edge and falling edge of the clock signal to obtain 32-bit data in the DDR transfer mode. Then, if the reception buffer controller 350 detects that the predetermined bit in a piece of data corresponding to the header of a packet is set to "1" indicating the SDR transfer mode, it sets the SDR instruction signal to ON when reception of the entire packet is completed to instruct the data sampling circuit 310 to change the transfer mode. The data sampling circuit 310, which is instructed to change the transfer mode to the SDR transfer mode, starts sampling data signals only at rising edges of the clock signal.

Figure 9:
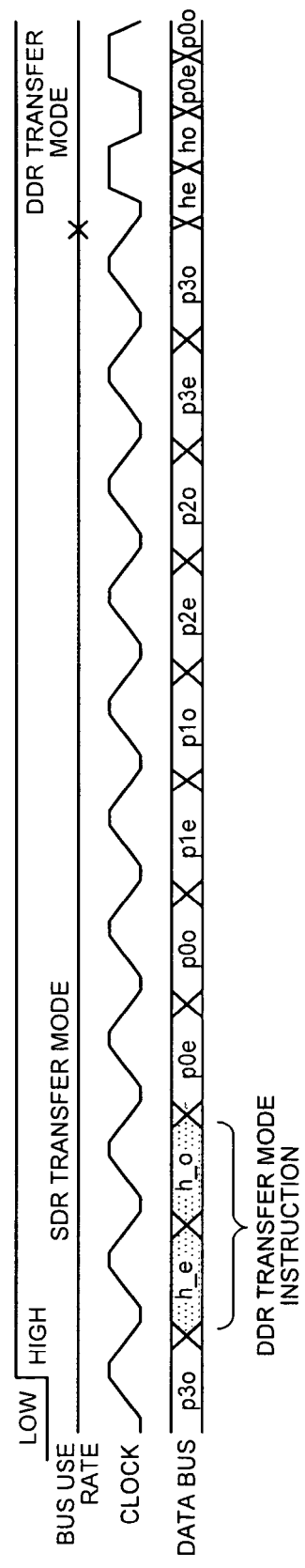
FIG. 9 is a diagram illustrating an example of an operation when the transfer mode is changed from the SDR transfer mode to the DDR transfer mode.

FIG. 9 is a diagram illustrating an example of an operation when the transfer mode is changed from the SDR transfer mode to the DDR transfer mode. It is assumed here that the value of the predetermined number of cycles set in the control register 220 is 0. As illustrated in FIG. 9, if the use rate of the bus rises, the transfer mode determiner 230 determines to change the transfer mode to the DDR transfer mode, and sets the SDR change request signal to OFF to instruct the transmission buffer controller 270 to change the transfer mode.

The transmission buffer controller 270, which is instructed to change the transfer mode to the DDR transfer mode, sets the SDR mode signal to OFF so as to set the predetermined bit of the header of a packet to be transmitted next to "0" indicating the DDR transfer mode. Since the transfer mode is still the SDR transfer mode at this point, the header and the payload of the packet in which the SDR transfer mode flag is set is transmitted in 32-bit data only at rising edges of the clock signal.

When the transmission of the entire packet is completed, the transmission buffer controller 270 sets the SDR instruction signal to OFF to instruct the data output circuit 280, the clock driver 290*a* and the data driver 290*b* to change the transfer mode. The data output circuit 280, which is instructed to change the transfer mode to the DDR transfer mode, starts transmitting the header and the payload of the packet in 32-bit data at every rising edge and falling edge of the clock signal. The clock driver 290*a*, which is instructed to change the transfer mode to the DDR transfer mode, reduces the slew rate of the output signal. Although not illustrated, the data driver 290*b*, which is instructed to change the transfer mode to the DDR transfer mode, also reduces the slew rate of the output signal.

On the other hand, the data sampling circuit 310 of the receiving circuit 30*d* samples data signals at every rising edge of the clock signal to obtain 32-bit data in the SDR transfer mode. Then, if the reception buffer controller 350 detects that the predetermined bit in a piece of data corresponding to the header of a packet is set to "0" indicating the DDR transfer mode, it sets the SDR instruction signal to OFF when reception of the entire packet is completed to instruct the data sampling circuit 310 to change the transfer mode. The data sampling circuit 310, which is instructed to change the transfer mode to the DDR transfer mode, starts sampling data signals at every rising edge and falling edge of the clock signal.

Figure 10:
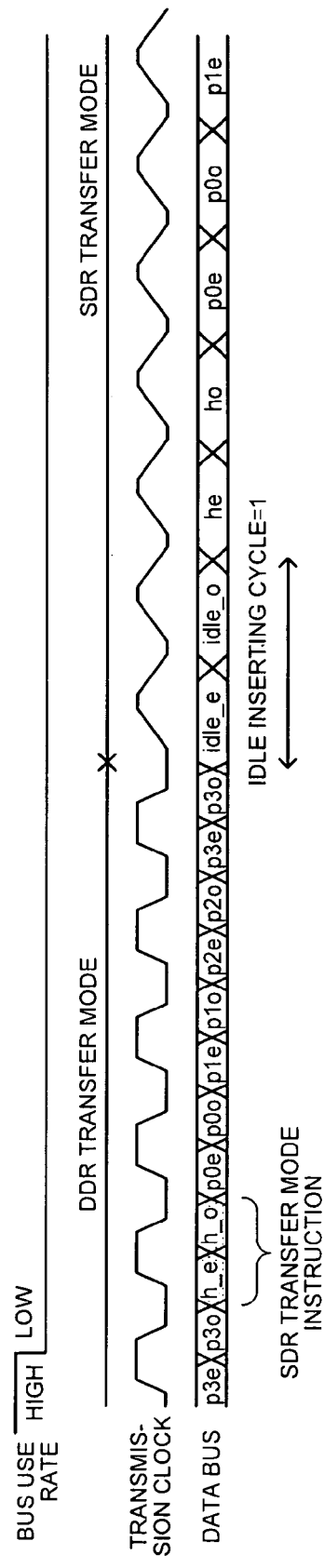
FIG. 10 is a diagram illustrating an example of an operation when it is configured such that IDLE packets are transferred for one cycle during the change of the transfer mode.
Figure 11:
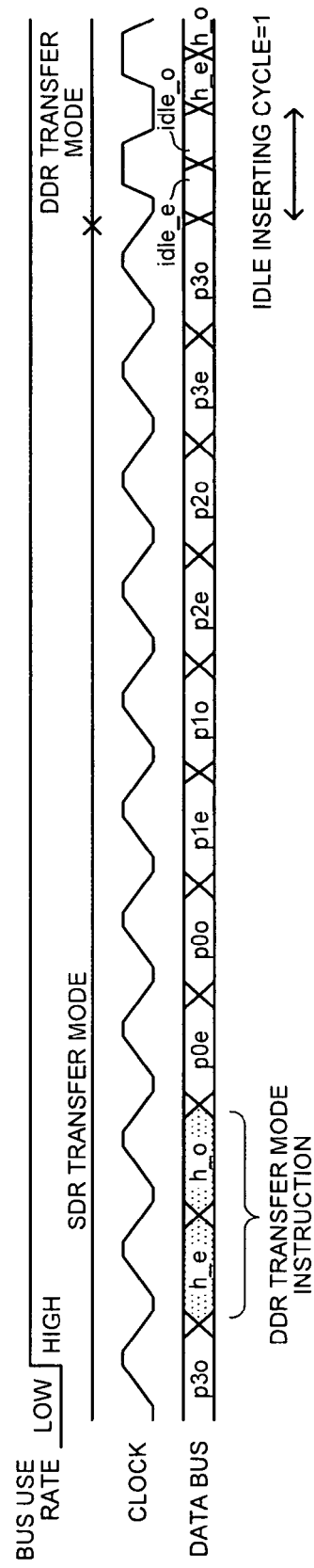
FIG. 11 is a diagram illustrating an example of an operation when it is configured such that IDLE packets are transferred for one cycle during the change of the transfer mode.

FIGS. 10 and 11 are diagrams illustrating examples of operations when it is configured such that IDLE packets are transferred for one cycle during the change of the transfer mode. As illustrated in FIGS. 10 and 11, when it is configured such that IDLE packets are transferred during the change of the transfer mode, the IDLE packets are transmitted for a set number of cycles immediately after the transfer mode is changed. By transferring dummy packets in this manner, it can be configured such that a packet loss does not occur even in a case where either one or both of the transmitting circuit 20*c* and the receiving circuit 30*d* cannot change the transfer mode at a sufficiently high speed.

Next, more detailed configurations of the transmitting circuit 20*c* and the receiving circuit 30*d* will be described. In the following description, components which are the same as those already described above are denoted by the same reference numerals and overlapping description thereof will not be repeated.

Figure 12:
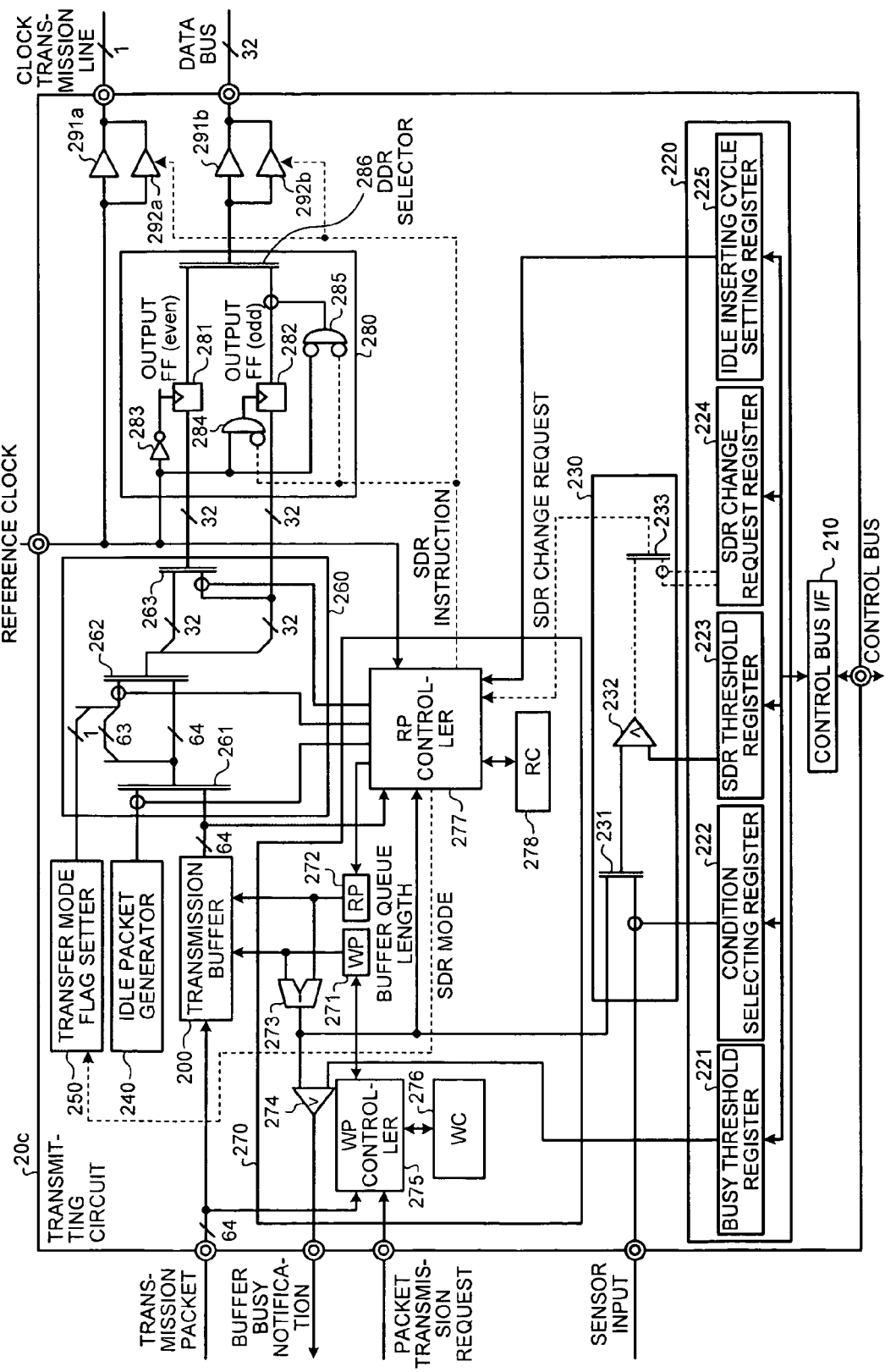
FIG. 12 is a block diagram illustrating a configuration of the transmitting circuit.

FIG. 12 is a block diagram illustrating the configuration of the transmitting circuit 20*c*. The control register 220 includes a busy threshold register 221, a condition selecting register 222, a SDR threshold register 223, a SDR change request register 224, and an IDLE inserting cycle setting register 225. The busy threshold register 221 stores a threshold for determining whether or not the transmission buffer 200 is in a busy state. In the condition selecting register 222, a value for selecting whether the transfer mode is determined based on the buffer queue length or based on a sensor input received from the temperature sensor 14 or the like. FIG. 12 illustrates a configuration in which only a preselected one of the buffer queue length and the sensor input is a criterion for determining the transfer mode. However, the transfer mode may be determined based on a logical sum or the like of the determination results using both of the buffer queue length and the sensor input as criteria for determination.

The SDR threshold register 223 stores a threshold that is compared with the buffer queue length or the sensor input so as to determine whether to set the transfer mode to the SDR transfer mode. The SDR change request register 224 stores a value indicating whether or not the management device 2 has forcibly specified the transfer mode. If the management device 2 has forcibly specified the transfer mode, the SDR change request register 224 also stores the transfer mode thus specified forcibly. The IDLE inserting cycle setting register 225 stores the number of cycles for which IDLE packets are transferred during switching of the transfer mode.

The transfer mode determiner 230 includes a selector 231, a comparator 232 and a selector 233. The selector 231 outputs either a buffer queue length input from the transmission buffer controller 270 or a sensor input based on a value of the condition selecting register 222 to the comparator 232. The comparator 232 compares a value output from the selector 231 and a value stored in the SDR threshold register 223, and outputs the comparison result to the selector 233. The selector 233 outputs a value corresponding to the transfer mode set in the SDR change request register 224 if the SDR change request register 224 stores that the management device 2 has forcibly specified the transfer mode, and otherwise outputs a value output from the comparator 232.

The transmission selector 260 includes a selector 261, a selector 262 and a selector 263. The selector 261 selects and outputs either 64-bit data output from the transmission buffer 200 or a 64-bit IDLE packet output from the IDLE packet generator 240 based on an instruction from the transmission buffer controller 270. The selector 262 outputs 64-bit data as output from the selector 261 or 64-bit data obtained by replacing the predetermined bit in the data output from the selector 261 by a 1-bit value output from the transfer mode flag setter 250 based on an instruction from the transmission buffer controller 270.

The 64-bit data output from the selector 262 is separated into even side 32-bit data and odd side 32-bit data. Then, the selector 263 outputs the even side 32-bit data or the odd side 32-bit data to the data output circuit 280 according to an instruction from the transmission buffer controller 270. The odd side 32-bit data is output to the data output circuit 280 without passing through the selector 263 even if it follows another path.

The transmission buffer controller 270 includes a WP 271, a RP 272, a subtracter 273, a comparator 274, a WP controller 275, a write counter (hereinafter referred to as a "WC") 276, an RP controller 277 and a read counter (hereinafter referred to as a "RC") 278. The WP 271 is a pointer for controlling a location in the transmission buffer 200 in which a transmission packet is written, and is incremented every time 64-bit data is written. The RP 272 is a pointer for controlling a location in the transmission buffer 200 from which a transmission packet is read, and is incremented every time 64-bit data is read.

The subtracter 273 subtracts a value of the WP 271 from a value of the RP 272 to calculate the buffer queue length, and outputs the calculated buffer queue length to the selector 231, the comparator 274 and the RP controller 277. The comparator 274 compares the buffer queue length input from the subtracter 273 with a threshold stored in the busy threshold register 221, and outputs a buffer busy notification to an upstream circuit.

The WP controller 275 controls writing in the transmission buffer 200. Specifically, when receiving a packet transmission request, the WP controller 275 decodes the header of a transmission packet to obtain the packet length and stores the header in the transmission buffer 200. Then, the WP controller 275 sets the packet length in the WC 276, and stores the transmission data in the transmission buffer 200 while decrementing the WC 276 until it reaches 0 and incrementing the WP 271. At the time when the WC 276 reaches 0, the whole of one transmission packet is stored in the transmission buffer 200.

The RP controller 277 controls reading from the transmission buffer 200. Specifically, if the buffer queue length input from the subtracter 273 is not 0, the RP controller 277 reads and decodes the header of a transmission packet from the transmission buffer 200 to obtain the packet length or the like. Then, the RP controller 277 causes the header to be output from the transmission buffer 200 to the data output circuit 280. Then, the RP controller 277 sets the packet length in the RC 278, and causes the transmission data to be output to the data output circuit 280 while decrementing the RC 278 until it reaches 0 and incrementing the RP 272. At the time when the RC 278 reaches 0, data corresponding to one transmission packet is output to the data output circuit 280.

Figure 13:
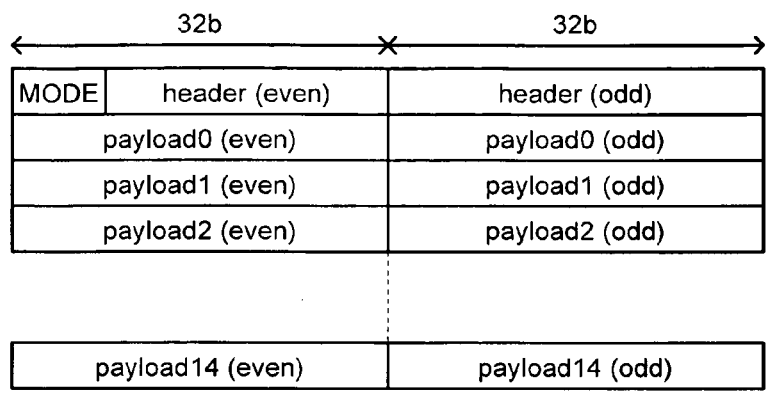
FIG. 13 is a diagram illustrating a packet format.

Here, a format of the packet is described. As illustrated in FIG. 13 as already described, a packet in the embodiment includes a 64-bit header and a payload having a length of a multiple of 64 bits.

Figure 14:
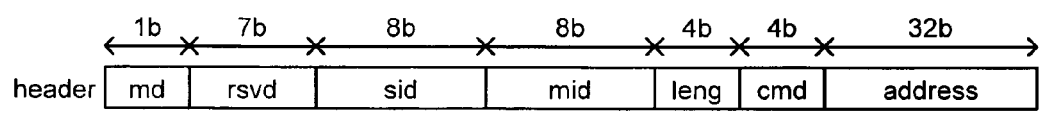
FIG. 14 is a diagram illustrating a header format.

FIG. 14 is a diagram illustrating a header format. As illustrated in FIG. 14, a header includes entries of "md", "rsvd", "sid", "mid", "leng", "cmd" and "address". The entry "md" is an entry in which the 1-bit transfer mode is set. The entry "rsvd" is a reserved entry. The entry "sid" is an entry in which an ID of a final destination device of the packet is set. The entry "mid" is an entry in which an ID of a source device of the packet is set. The entry "leng" is an entry in which a code representing the packet length is set. The entry "cmd" is an entry in which a code representing the packet type is set. The entry "address" is an entry in which an address of a subject to be processed is set.

FIG. 15 is a table illustrating a list of codes set in "leng". As illustrated in FIG. 15, a code "0000" indicates that the packet is only composed of a header, and a code "0001" indicates that the packet includes a header and a 64-bit payload, for example. The RP controller 277 determines the packet length based on the code set in "leng".

FIG. 16 is a table illustrating a list of codes set in "cmd". As illustrated in FIG. 16, a code "0000" indicates that the packet is an IDLE packet, for example. An IDLE packet is composed only of a header as illustrated in FIG. 17 as already described. Therefore, in a header of an IDLE packet, "0000" is always set in the entry of "cmd" and "0000" is always set in the entry of "leng". Values in the other entries of a header of an IDLE packet do not mean anything except for "md" in which the transfer mode is set.

Referring back to the description of FIG. 12, if the buffer queue length input from the subtracter 273 is 0, that is, if no transmission packet is stored in the transmission buffer 200, the RP controller 277 instructs the selector 261 to output an IDLE packet to the data output circuit 280.

Further, if a change of the transfer mode is notified by an SDR change signal input from the transfer mode determiner 230, the RP controller 277 switches the SDR mode signal to be output to the transfer mode flag setter 250 to change the transfer mode set in the next and subsequent packets. Then, the RP controller 277 performs the operation described above to cause the first transmission packet or IDLE packet in which the transfer mode as changed is set to be output to the data output circuit 280, and thereafter switches the SDR instruction signal to be output to the data output circuit 280, etc.

Further, the RP controller 277 instructs the selector 261 to output IDLE packets for a number of cycles set in the IDLE inserting cycle setting register 225 to the data output circuit 280.

If a piece of data corresponding to a header is output from the transmission buffer 200 or the IDLE packet generator 240, the RP controller 277 instructs the selector 262 to include a value output from the transfer mode flag setter 250 in the header. On the other hand, if a piece of data corresponding to a payload is output from the transmission buffer 200, the RP controller 277 instructs the selector 262 to output the data piece without any change.

The RP controller 277 also controls the selector 263 so that even side data and odd side data are alternately output at every one clock when the SDR instruction signal is ON, that is, while packets are actually transferred in the SDR transfer mode. On the other hand, the RP controller 277 controls the selector 263 so that only even side data is output while the SDR instruction signal is OFF, that is, while packets are actually transferred in the DDR transfer mode.

The data output circuit 280 includes an output flip-flop (FF) 281, an output FF 282, a NOT circuit 283, an AND circuit 284, an AND circuit 285 and a DDR selector 286. The output FF 281 outputs 32-bit data input from the selector 263 to the DDR selector 286 at a timing of rising of the reference clock that is phase-inverted by the NOT circuit 283, that is, at a timing of falling of the normal reference clock. The output FF 282 outputs 32-bit data input through another path without passing through the selector 263 to the DDR selector 286 at a timing of rising of the reference clock.

The AND circuit 284 stops supply of the reference clock to the output FF 282 when the SDR instruction signal is ON, that is, while packets are actually transferred in the SDR transfer mode. By stopping supply of the reference clock to the output FF 282 in the SDR transfer mode in this manner, it is possible to save power consumed by the output FF 282.

The AND circuit 285 causes the DDR selector 286 to select only the output from the output FF 281 when the SDR instruction signal is ON, that is, while packets are actually transferred in the SDR transfer mode. On the other hand, when the SDR instruction signal is OFF, that is, while packets are actually transferred in the DDR transfer mode, the AND circuit 285 causes the DDR selector 286 to output the output from the output FF 281 and the output from the output FF 282 alternately at rising and falling of the reference clock.

The clock driver 290a that outputs the reference clock includes a plurality of drivers such as a clock driver 291a and a clock driver 292a. Similarly, the data driver 290b that outputs 32-bit data output from the DDR selector 286 includes a plurality of drivers such as a data driver 291b and a data driver 292b. While the SDR instruction signal is ON, the clock driver 290a and the data driver 290b stop some of the drivers to reduce the slew rate and the power consumption.

Figure 18:
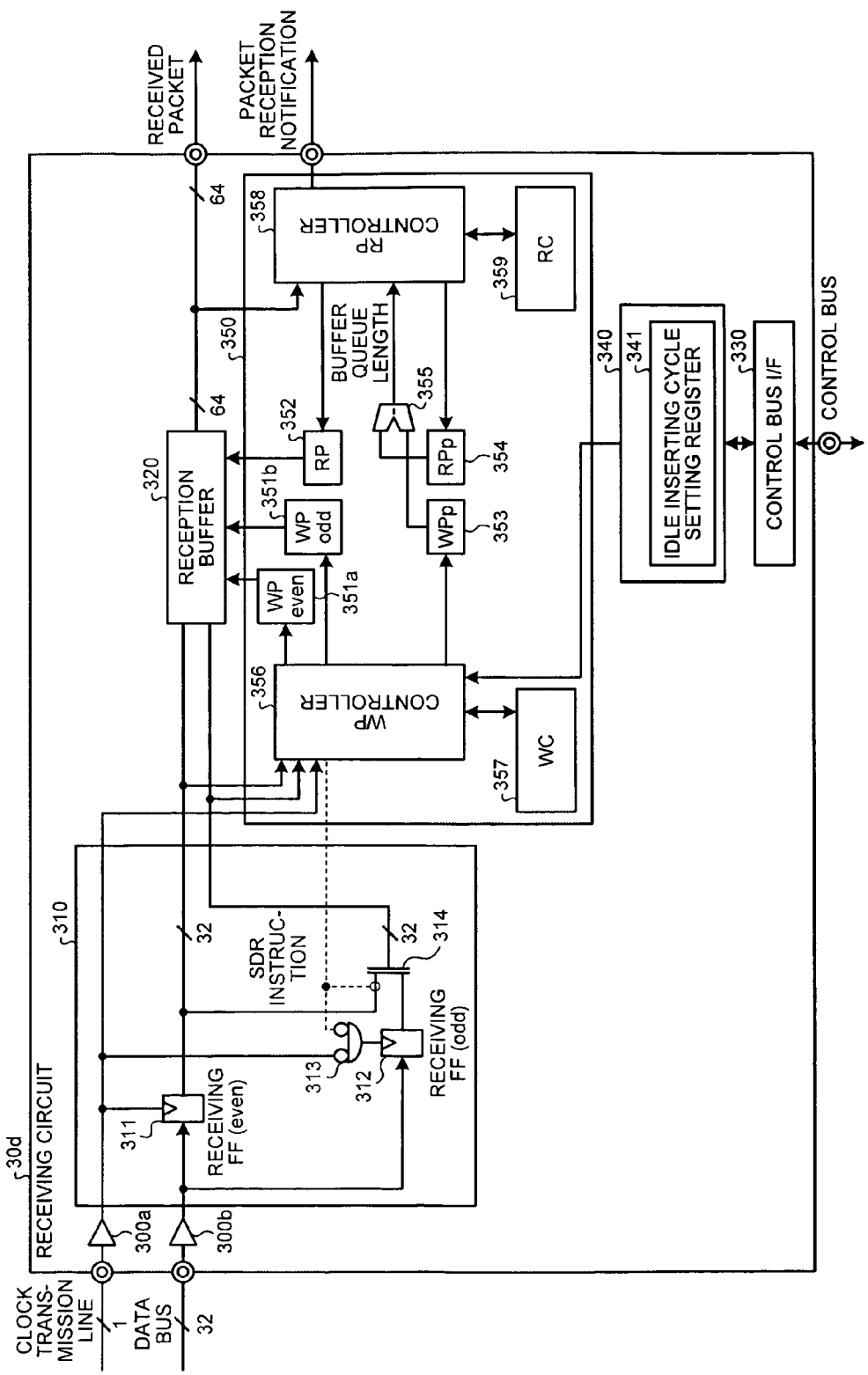
FIG. 18 is a block diagram illustrating a configuration of the receiving circuit.

FIG. 18 is a block diagram illustrating a configuration of the receiving circuit 30d. The data sampling circuit 310 includes a receiving FF 311, a receiving FF 312, an AND circuit 313 and a selector 314. The receiving FF 311 samples data at a timing of rising of the reference clock, and outputs the resulting data to the reception buffer 320, the selector 314, and a WP controller 356. The receiving FF 312 samples data at a timing of falling of the reference clock, and outputs the resulting data to the selector 314.

The AND circuit 313 stops supply of the reference clock to the receiving FF 312 when the SDR instruction signal is ON, that is, while packets are actually transferred in the SDR transfer mode. By stopping supply of the reference clock to the receiving FF 312 in the SDR transfer mode in this manner, it is possible to save power consumed by the receiving FF 312. The selector 314 outputs the output of the receiving FF 312 to the reception buffer 320 and the WP controller 356 when the SDR instruction signal is OFF, and outputs the output of the receiving FF 311 to the reception buffer 320 and the WP controller 356 when the SDR instruction signal is ON.

The control register 340 includes an IDLE inserting cycle setting register 341. The IDLE inserting cycle setting register 341 stores the same information as the IDLE inserting cycle setting register 225 in the transmitting circuit 20c.

The reception buffer controller 350 includes a WPeven 351a, a WPodd 351b, a RP 352, a WPp 353, a RPp 354, a subtracter 355, the WP controller 356, a WC 357, a RP controller 358 and an RC 359. The WPeven 351a is a pointer for controlling a location in the reception buffer 320 in which even side data is written, and is incremented every time 32-bit data is written. The WPodd 351b is a pointer for controlling a location in the reception buffer 320 in which odd side data is written, and is incremented every time 32-bit data is written. The RP 352 is a pointer for controlling a location in the reception buffer 320 from which a packet is read, and is incremented every time 64-bit data is read.

The WPp 353 is a register for controlling the number of packets stored in the reception buffer 320, and is incremented every time a packet is stored in the reception buffer 320. The RPp 354 is a register for controlling the number of packets read from the reception buffer 320, and is incremented every time a packet is read from the reception buffer 320. The subtracter 355 outputs a difference between the WPp 353 and the RPp 354 to the RP controller 358.

The WP controller 356 decodes a header input from the receiving FF 311 or headers input from the receiving FF 311 and the selector 314 to obtain the packet length, the packet type and the transfer mode. If it is determined that the packet is an IDLE packet based on the packet type, the WP controller 356 discards the packet without storing it in the reception buffer 320.

On the other hand, if it is determined that the packet is not an IDLE packet, the WP controller 356 sets the packet length in the WC 357, stores the packet in the reception buffer 320 while decrementing the WC 357 until it reaches 0 and incrementing the WPeven 351a and the WPodd 351b. At the time when the WC 357 reaches 0 and the entire packet is stored in the reception buffer 320, the WP controller 356 increments the WPp 353.

If a value of the transfer mode is changed, the WP controller 356 switches the SDR instruction signal to be output to the data sampling circuit 310 after the process on the packet in which the transfer mode is set is completed. Then, the WP controller 356 discards data input to the reception buffer 320 for a number of cycles set in the IDLE inserting cycle setting register 341.

If the RP controller 358 determines that a packet is stored in the reception buffer 320 based on the difference between the WPp 353 and the RPp 354, it asserts a packet reception notification. Then, the RP controller 358 reads and decodes the header of the packet from the reception buffer 320 to obtain the packet length and the like, and causes the header to be output from the reception buffer 320. Then, the RP controller 358 sets the packet length in the RC 359, and causes the data to be output from the reception buffer 320 while decrementing the RC 359 until it reaches 0 and incrementing the RP 352. At the time when the RC 359 reaches 0, data corresponding to one packet is output from the reception buffer 320.

Figure 19A:
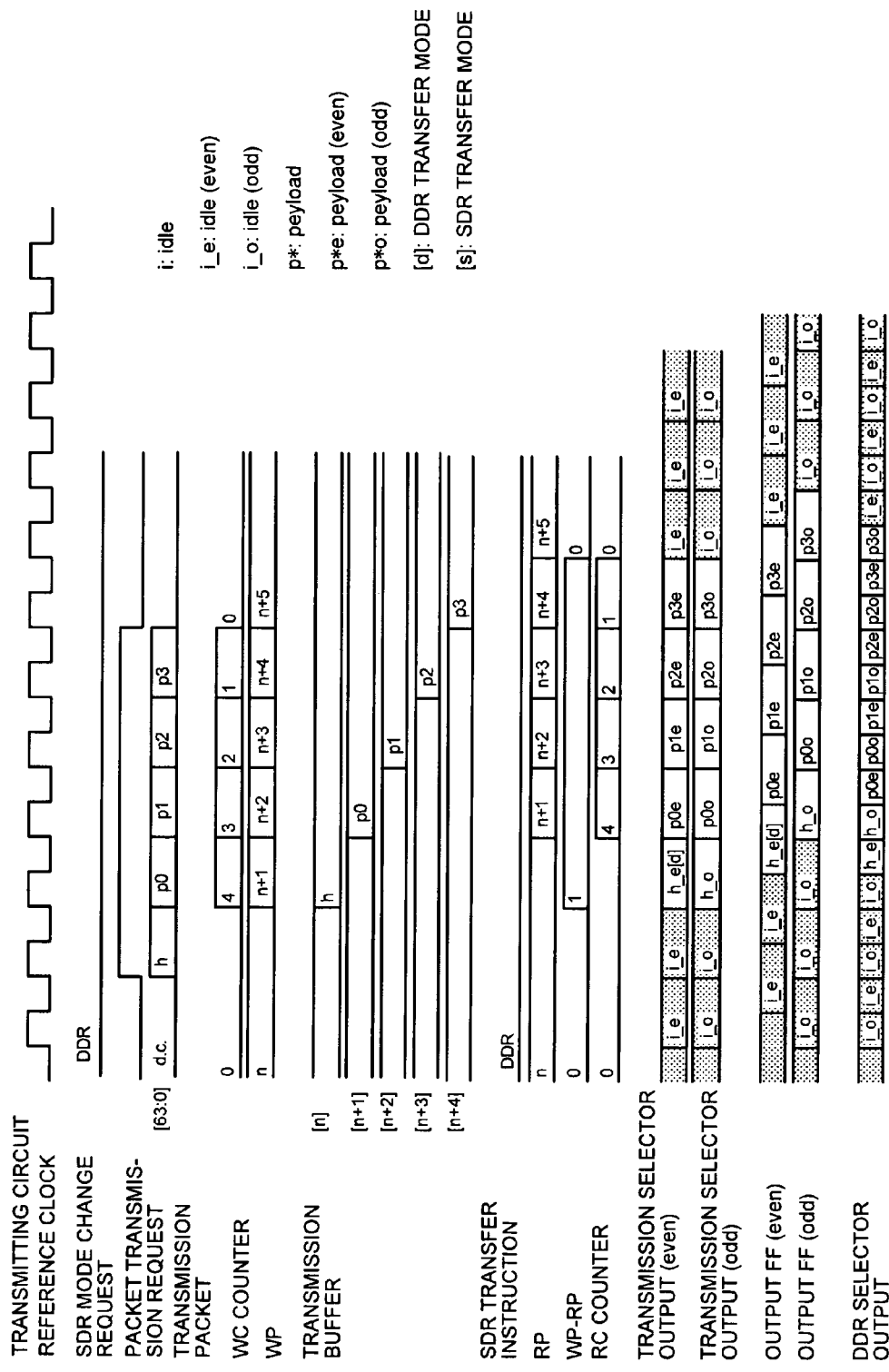

Next, examples of operations of the transmitting circuit 20c illustrated in FIG. 12 and the receiving circuit 30d illustrated in FIG. 18 are described. FIGS. 19A and 19B illustrate an operation in the DDR transfer mode. If transmission of a packet including a 64-bit header and a payload of 256 bits that is four times 64 is requested, the WP controller 275 stores portions of the packet in the transmission buffer 200 while updating the WC 276 and the WP 271.

If the RP controller 277 detects that a packet is present in the transmission buffer 200 based on the difference between the WP 271 and the RP 272, it causes the portions of the packet to be read and output in the DDR transfer mode while updating the RP 272 and the RC 278. Then, the receiving circuit 30d stores the received data in the reception buffer 320, and starts outputting the data to a downstream circuit after all the data corresponding to the whole packet is stored in the reception buffer.

Figure 20B:
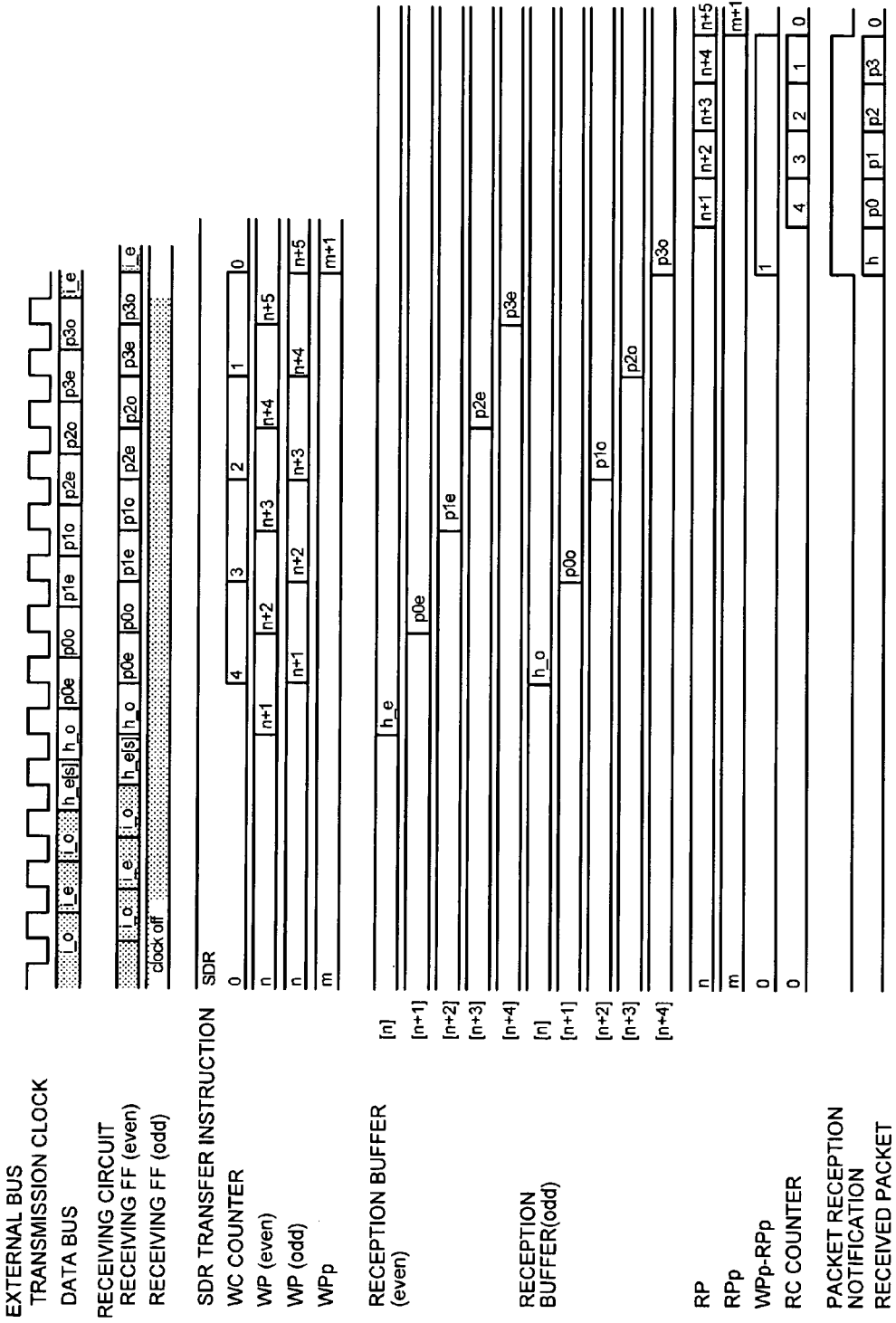
Figure 21A:
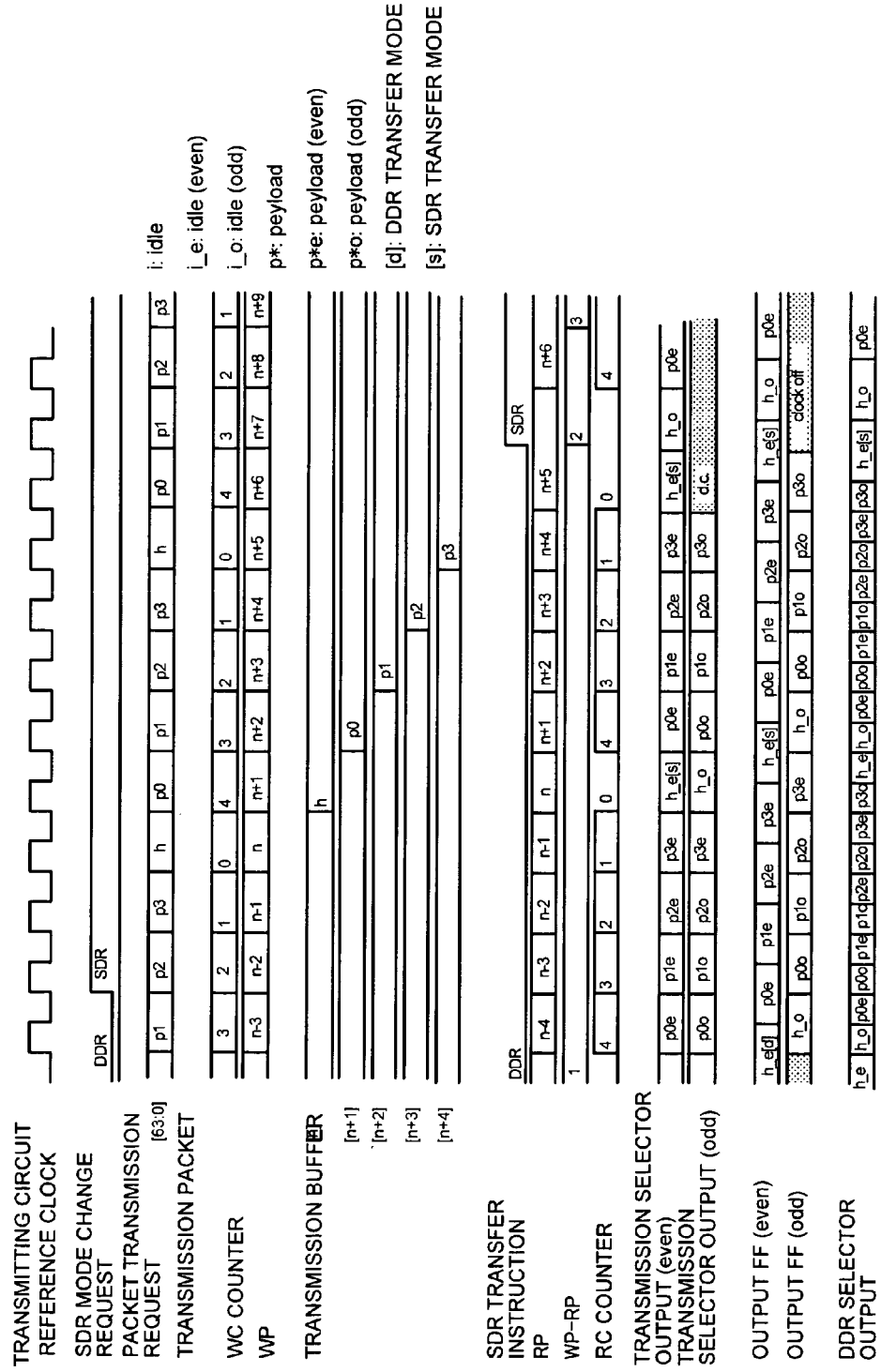
FIGS. 21A and 21B illustrate an operation of switching from the DDR transfer mode to the SDR transfer mode.
Figure 21B:
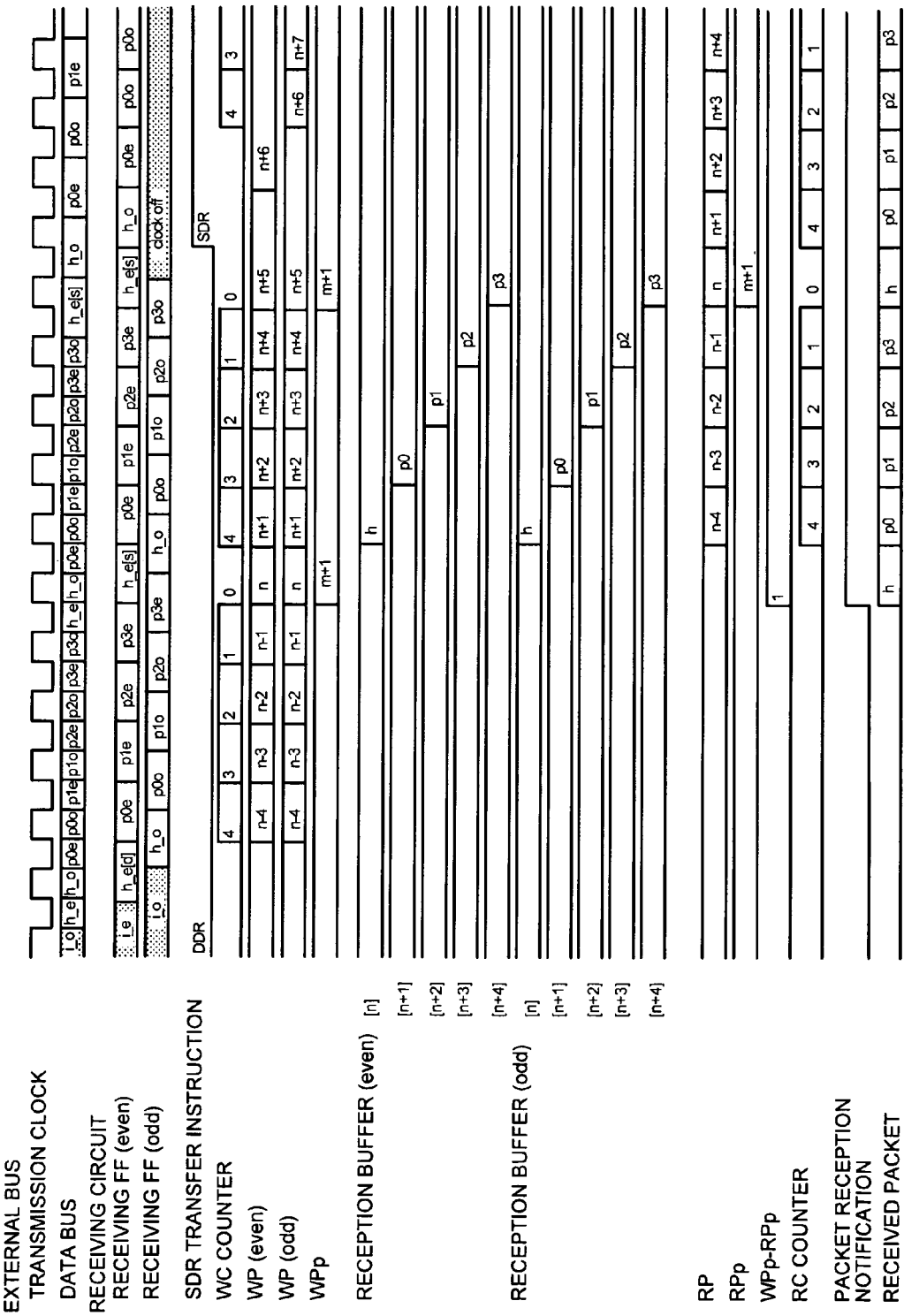
Figure 22A:
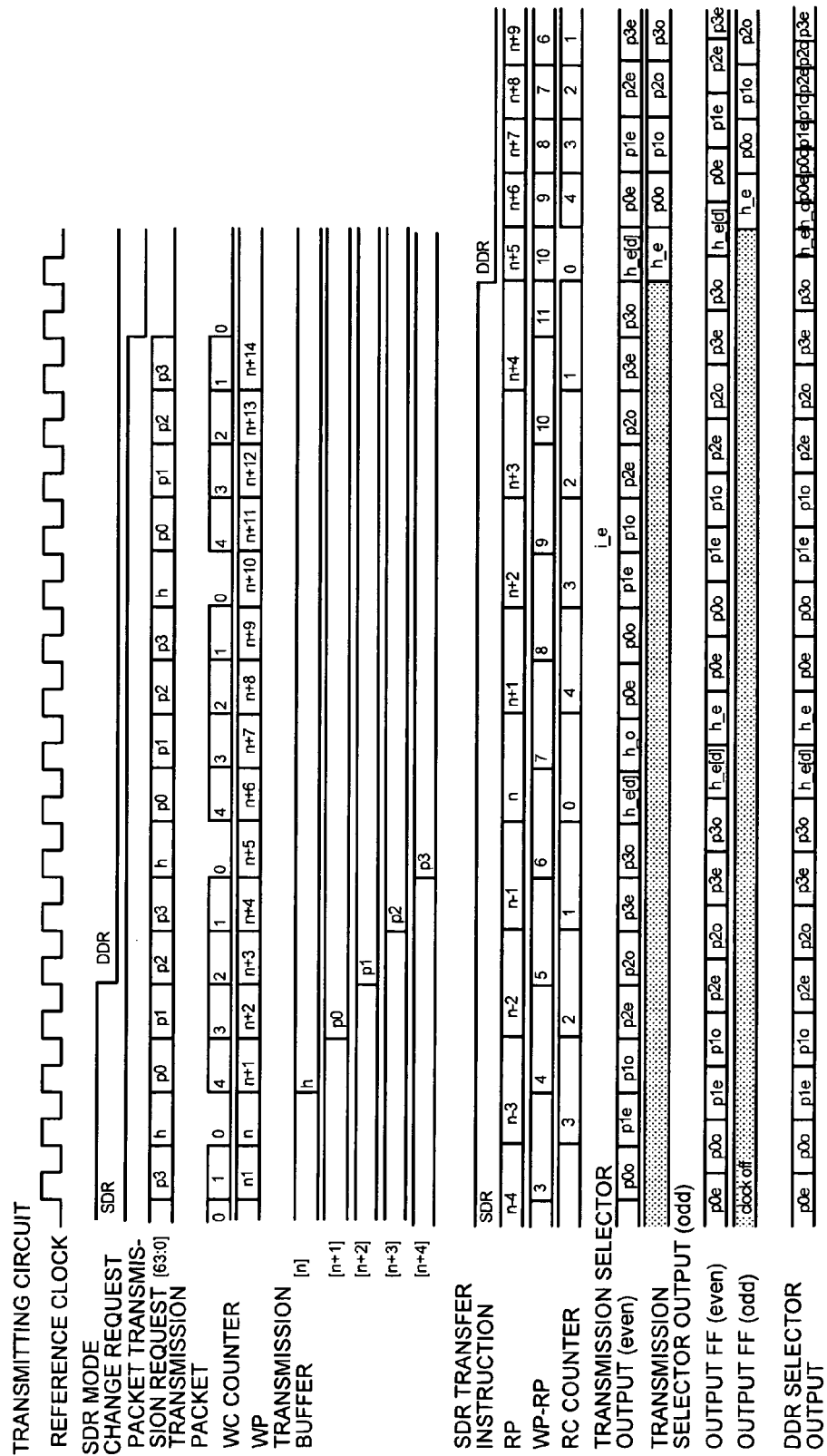
FIGS. 22A and 22B illustrate an operation of switching from the SDR transfer mode to the DDR transfer mode.
Figure 22B:
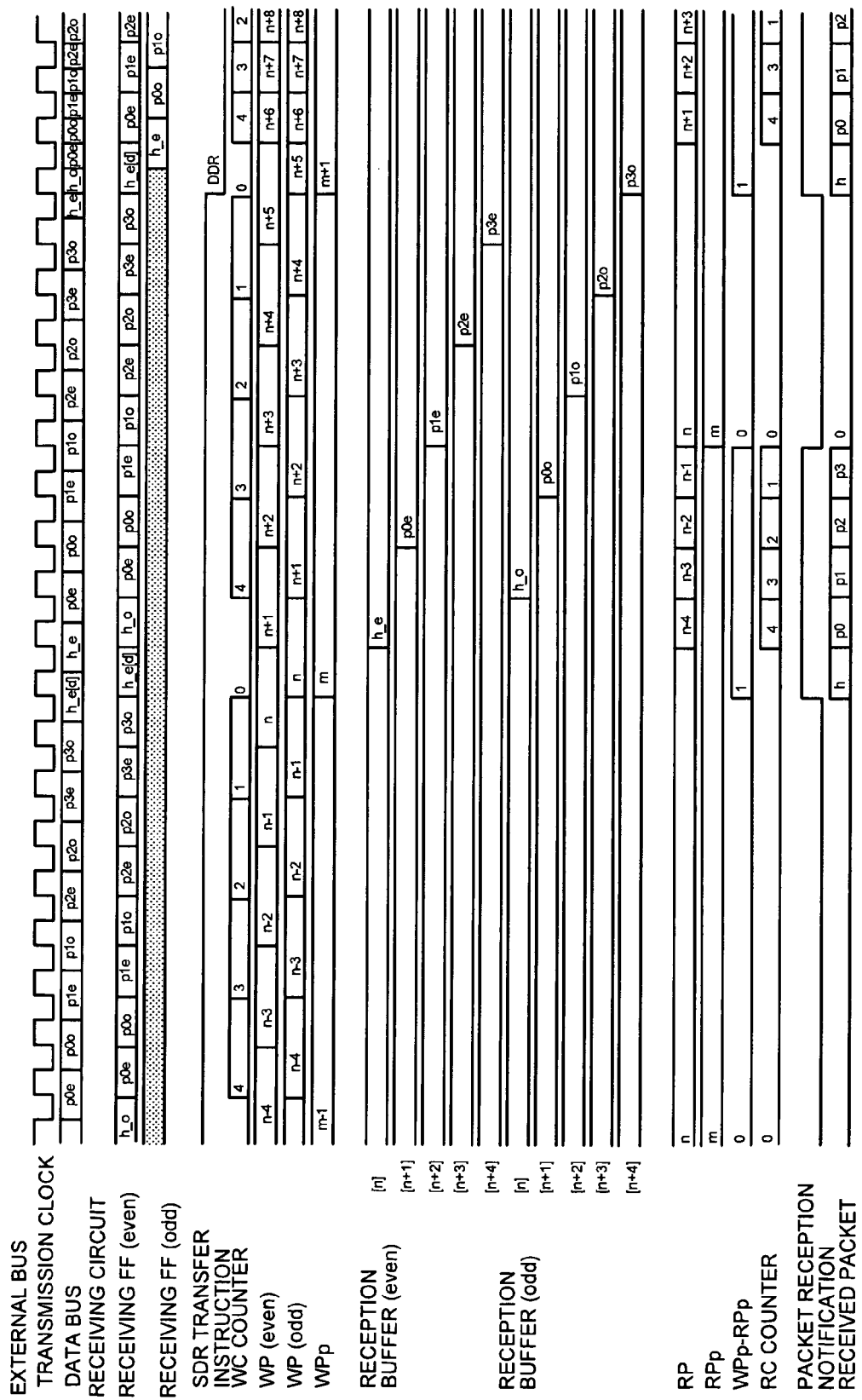

FIGS. 20A and 20B illustrate an operation in the SDR transfer mode; FIGS. 21A and 21B illustrate an operation during switching from the DDR transfer mode to the SDR transfer mode; and FIGS. 22A and 22B illustrate an operation during switching from the SDR transfer mode to the DDR transfer mode. As illustrated in these figures, in the SDR transfer mode, the output FF 282 in the transmitting circuit 20c and the receiving FF 312 in the receiving circuit 30d can be stopped by stopping the clock supply thereto, and thereby power saving is realized.

As described above, according to the embodiment, the change of the transfer mode is notified by using a predetermined bit in a header of a packet. Therefore, the transfer mode can be dynamically switched from the DDR to the SDR without complicating the configuration. By switching the transfer mode from the DDR mode to the SDR mode, the power consumption of the data sampling circuit 310 and the like can be reduced to about ½. Further, by changing the slew rate of drivers when the transfer mode is the SDR mode, the power consumption can be further reduced.

In addition, since the delay time of a CMOS device varies depending on the temperature, the transmission margin of the receiving circuit will be smaller in an environment where the device temperature is extremely high or low. For example, if the transmission margin is small due to a high temperature, it is possible to ensure the transmission margin by changing the transfer mode from the DDR to the SDR when the temperature of the device becomes higher than a threshold, and thereby to reduce the transmission error rate. Thus, the technique disclosed herein is also effective for suppressing the transmission error rate.

According to an aspect of the embodiment, the transfer mode is dynamically changed from the DDR to the SDR based on a value set in a header of a packet without providing any special signal line, thereby the transfer mode can be dynamically switched to the SDR at which power consumption is low without complicating the configuration.

Other aspects in which the components and any combinations of the representations and the components of the data transfer device disclosed herein are applied to a method, a device, a system, a computer program, a recording medium, a data structure and the like are also effective in achieving the aforementioned object.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data transfer device comprising:
a transmitting circuit that transmits data by using a packet to another data transfer device in a double data rate mode in which data is transferred at every rising and falling of a clock signal or in a single data rate mode in which data is transferred at every rising or at every falling of a clock signal, wherein
the transmitting circuit includes
a determining unit that determines whether to transmit data in the double data rate mode or in the single data rate mode;
a setting unit that sets transfer mode information, which indicates the determined first or single data rate mode, in a predetermined bit in a header of the packet;
an output unit that outputs data using the determined first or single data rate mode to the another data transfer device in synchronization with the clock signal; and
a transmission control unit that, when a transfer mode determined by the determining unit has changed, instructs the setting unit to set transfer mode information indicating a transfer mode as changed in the packet and instructs the output unit to output data using the transfer mode as changed after outputting of a first packet in which a value indicating the transfer mode as changed is set is completed, and
a receiving circuit that receives data transmitted from the another data transfer device in the double data rate mode or in the single data rate mode, wherein
the receiving circuit includes a receiving unit that receives data transmitted from the another data transfer device in a predetermined one of the double data rate mode and the single data rate mode in synchronization with the clock signal; and
a reception control unit that, when transfer mode information contained in the received data is different from the predetermined one of the first data transfer mode and the second data transfer mode, instructs the receiving unit to receive data using the transfer mode indicated by the transfer mode information after receiving the packet containing the transfer mode information as changed.

2. The data transfer device according to claim 1, wherein the transmission control unit causes the output unit to output dummy data for a predetermined period after instructing the output unit to output data in the transfer mode as changed, and
the reception control unit discards data received by the receiving unit for the period after instructing the receiving unit to receive data based on the transfer mode information.

3. The data transfer device according to claim 1, wherein when outputting data in the single data rate mode, the output unit sets a slew rate, which represents a gradient of a rising voltage or a falling voltage per unit time of a signal included in the data to be output, to be smaller than a slew rate when data is output in the double data rate mode.

4. The data transfer device according to claim 1, wherein when outputting data in the single data rate mode, the output unit causes a circuit operating only when data is output in the double data rate mode to stop.

5. The data transfer device according to claim 1, wherein when receiving data in the single data rate mode, the receiving unit causes a circuit operating only when data is received in the double data rate mode to stop.

6. The data transfer device according to claim 1, wherein the determining unit determines the transfer mode to be the double data rate mode when a use rate, which represents a data transfer amount per unit time in a transmission line between the data transfer device and the another data transfer device, is higher than a predetermined threshold, and determines the transfer mode to be the single data rate mode when the use rate is smaller than the threshold.

7. The data transfer device according to claim 1, wherein the determining unit determines the transfer mode to be the single data rate mode when a temperature measured by a temperature sensor is higher than a predetermined threshold, and determines the transfer mode to be the double data rate mode when the temperature is lower than the threshold.

8. A data transmitting device that transmits data by using a packet to another data transmitting device in either of a double data rate mode in which data is transferred at every rising and falling of a clock signal or a single data rate mode in which data is transferred at every rising or at every falling of a clock signal, the data transmitting device comprising:
a determining unit that determines whether to transmit data in the double data rate mode or in the single data rate mode;
a setting unit that sets transfer mode information, which indicates the determined first or single data rate mode, in the a predetermined bit in a header of the packet;
an output unit that outputs data using the determined first or single data rate mode to the another data transfer device in synchronization with the clock signal; and
a transmission control unit that, when a transfer mode determined by the determining unit has changed, instructs the setting unit to set transfer mode information indicating a transfer mode as changed in the packet and instructs the output unit to output data using the transfer mode as changed after outputting of a first packet in which a value indicating the transfer mode as changed is set is completed.

9. The data transmitting device according to claim 8, wherein
the transmission control unit causes the output unit to output dummy data for a predetermined period after instructing the output unit to output data in the transfer mode as changed.

10. The data transmitting device according to claim 8, wherein
when outputting data in the single data rate mode, the output unit sets a slew rate, which represents a gradient of a rising voltage or a falling voltage per unit time of a signal included in the data to be output, to be smaller than a slew rate when data is output in the double data rate mode.

11. The data transmitting device according to claim 8, wherein
when outputting data in the single data rate mode, the output unit causes a circuit operating only when data is output in the double data rate mode to stop.

12. The data transmitting device according to claim 8, wherein
the determining unit determines the transfer mode to be the double data rate mode when a use rate, which represents a data transfer amount per unit time in a transmission line between the data transfer device and the another data transmitting device, is higher than a predetermined threshold, and determines the transfer mode to be the single data rate mode when the use rate is smaller than the threshold.

13. The data transmitting device according to claim 8, wherein
the determining unit determines the transfer mode to be the single data rate mode when a temperature measured by a temperature sensor is higher than a predetermined threshold, and determines the transfer mode to be the double data rate mode when the temperature is lower than the threshold.

14. A data receiving device for receiving data transmitted by using a packet from a data transfer device in a double data rate mode in which data is transferred at every rising and falling of a clock signal or in a single data rate mode in which data is transferred at every rising or at every falling of a clock signal, the data receiving device comprising:
a receiving unit that receives data transmitted from the data transfer device in a predetermined one of the double data rate mode and the single data rate mode in synchronization with the clock signal; and
a reception control unit that, when transfer mode information contained in the received data is different from the predetermined one of the first data transfer mode and the second data transfer mode, instructs the receiving unit to receive data using the transfer mode indicated by the transfer mode information after receiving the packet containing the transfer mode information as changed.

15. The data receiving device according to claim 14, wherein
when receiving data in the single data rate mode, the output unit causes a circuit operating only when data is received in the double data rate mode to stop.

16. A data transfer method for transmitting data by using a packet from a first data transfer device to a second data transfer device in either of a double data rate mode in which data is transferred at every rising and falling of a clock signal and a single data rate mode in which data is transferred at every rising or at every falling of a clock signal, the data transfer method comprising:
determining, by the first data transfer device, switching of the transfer mode, setting, by the first data transfer device, transfer mode information indicating the transfer mode after the switching in a predetermined bit in a header of the packet to be transmitted to the second data transfer device;
transmitting, by the first data transfer device, the data to the second data transfer device in the a predetermined transfer mode of the double data rate mode and the single data rate mode;
setting, by the first data transfer device, the double data rate mode or the single data rate mode as a new transfer mode for transmitting new data;
transmitting, by the first data transfer device, dummy data to the second transfer unit for a predetermined period after wetting the new transfer mode;
receiving, by the second data transfer device, the packet containing data transfer information indicating the new transfer mode;
setting, by the second data transfer device, a transfer mode for receiving new data to the new transfer mode indicated by the transfer mode information contained in the packet after receiving the packet containing the transfer mode information as changed; and discarding, by the second transfer unit, data received for a predetermined period after setting the new transfer mode.

* * * * *

UNITED STATES PATENT AND TRADEMARK OFFICE
CERTIFICATE OF CORRECTION

| | |
|---|---|
| PATENT NO. | : 8,494,010 B2 |
| APPLICATION NO. | : 12/929511 |
| DATED | : July 23, 2013 |
| INVENTOR(S) | : Kenji Suzuki |

It is certified that error appears in the above-identified patent and that said Letters Patent is hereby corrected as shown below:

In the Claims

Column 20, Line 51, In Claim 16, after "in the" delete "a".

Signed and Sealed this
Eighteenth Day of February, 2014

Michelle K. Lee
*Deputy Director of the United States Patent and Trademark Office*